United States Patent
Bereciartua-Perez et al.

(10) Patent No.: US 12,283,053 B2
(45) Date of Patent: Apr. 22, 2025

(54) SYSTEM AND METHOD FOR DETERMINING DAMAGE ON CROPS

(71) Applicant: BASF SE, Ludwigshafen am Rhein (DE)

(72) Inventors: Aranzazu Bereciartua-Perez, Derio (ES); Artzai Picon Ruiz, Derio (ES); Javier Romero Rodriguez, Utrera (ES); Juan Manuel Contreras Gallardo, Utrera (ES); Rainer Oberst, Limburgerhof (DE); Hikal Khairy Shohdy Gad, Limburgerhof (DE); Gerd Kraemer, Limburgerhof (DE); Christian Klukas, Limburgerhof (DE); Till Eggers, Ludwigshafen am Rhein (DE); Jone Echazarra Huguet, Derio (ES); Ramon Navarra-Mestre, Limburgerhof (DE)

(73) Assignee: BASF SE, Ludwigshafen am Rhein (DE)

( * ) Notice: Subject to any disclaimer, the term of this patent is extended or adjusted under 35 U.S.C. 154(b) by 399 days.

(21) Appl. No.: 17/779,819

(22) PCT Filed: Nov. 24, 2020

(86) PCT No.: PCT/EP2020/083199
§ 371 (c)(1),
(2) Date: May 25, 2022

(87) PCT Pub. No.: WO2021/110476
PCT Pub. Date: Jun. 10, 2021

(65) Prior Publication Data
US 2023/0017425 A1   Jan. 19, 2023

(30) Foreign Application Priority Data
Dec. 3, 2019 (EP) .................................. 19213250

(51) Int. Cl.
*G06T 7/00* (2017.01)
*G06T 3/40* (2024.01)
(Continued)

(52) U.S. Cl.
CPC .............. *G06T 7/11* (2017.01); *G06T 3/4046* (2013.01); *G06T 7/0002* (2013.01);
(Continued)

(58) Field of Classification Search
CPC ......... G06T 7/11; G06T 3/404; G06T 7/0002; G06T 2207/10024; G06T 2207/20021;
(Continued)

(56) References Cited

U.S. PATENT DOCUMENTS 9,898,688 B2 *   2/2018  Bleiweiss ............. G06T 7/0004
10,713,542 B2 *  7/2020  Gui ....................... G06V 20/188
(Continued)

OTHER PUBLICATIONS

International Search Report and Written Opinion of International Application No. PCT/EP2020/083199 mailed Feb. 19, 2021, 20 pgs.
(Continued)

*Primary Examiner* — Gregory M Desire
(74) *Attorney, Agent, or Firm* — ArentFox Schiff LLP

(57) ABSTRACT

A computer-implemented method, computer program product and computer system (100) for determining the impact of herbicides on crop plants (11) in an agricultural field (10). The system includes an interface (110) to receive an image (20) with at least one crop plant representing a real world situation in the agricultural field (10) after herbicide application. An image pre-processing module (120) rescales the received image (20) to a rescaled image (20*a*) matching the size of an input layer of a first fully convolutional neural network (CNN1) referred to as the first CNN. The first CNN is trained to segment the rescaled image (20*a*) into crop (11) and non-crop (12, 13) portions, and provides a first seg-
(Continued)

mented output (20s1) indicating the crop portions (20c) of the rescaled image with pixels belonging to representations of crop. A second fully convolutional neural network (CNN2), referred to as the second CNN, is trained to segment said crop portions into a second segmented output (20s2) with one or more sub-portions (20n, 20l) with each sub-portion including pixels associated with damaged parts of the crop plant showing a respective damage type (11-1, 11-2). A damage measurement module (130) determines a damage measure (131) for the at least one crop plant for each damage type (11-1, 11-2) based on the respective sub-portions of the second segmented output (20s2) in relation to the crop portion of the first segmented output (20s1).

15 Claims, 14 Drawing Sheets

(51) Int. Cl.
| | | |
|---|---|---|
| *G06T 3/4046* | (2024.01) | |
| *G06T 7/11* | (2017.01) | |
| *G06V 10/44* | (2022.01) | |
| *G06V 10/764* | (2022.01) | |
| *G06V 10/774* | (2022.01) | |
| *G06V 10/776* | (2022.01) | |
| *G06V 10/82* | (2022.01) | |
| *G06V 20/10* | (2022.01) | |
| *G06V 20/70* | (2022.01) | |

(52) U.S. Cl.
CPC .......... *G06V 10/454* (2022.01); *G06V 10/764* (2022.01); *G06V 10/774* (2022.01); *G06V 10/776* (2022.01); *G06V 10/82* (2022.01); *G06V 20/188* (2022.01); *G06V 20/70* (2022.01); *G06T 2207/10024* (2013.01); *G06T 2207/20021* (2013.01); *G06T 2207/20081* (2013.01); *G06T 2207/20084* (2013.01); *G06T 2207/30188* (2013.01)

(58) Field of Classification Search
CPC .......... G06T 2207/20081; G06T 2207/20084; G06T 2207/30188; G06V 20/70; G06V 10/454; G06V 10/82; G06V 20/188; G06V 10/774; G06V 10/776; G06V 10/764
See application file for complete search history.

(56) References Cited

U.S. PATENT DOCUMENTS

| | | | | |
|---|---|---|---|---|
| 11,073,505 | B2* | 7/2021 | Zhang | H04N 7/185 |
| 11,093,745 | B2* | 8/2021 | Redden | G06V 10/255 |
| 11,263,707 | B2* | 3/2022 | Perry | A01C 21/00 |
| 2019/0259108 | A1* | 8/2019 | Bongartz | A01G 31/02 |
| 2019/0362146 | A1 | 11/2019 | Polzounov et al. | |

OTHER PUBLICATIONS

Milioto, et al., "Real-Time Semantic Segmentation of Crop and Weed for Precision Agriculture Robots Leveraging Background Knowledge in CNNs," 2018 IEEE International Conference on Robotics and Automation (ICRA), IEEE, May 21, 2018, pp. 2229-2235.

Lin, et al., "Deep Learning-Based Segmentation and Quantification of Cucumber Powdery Mildew Using Convolutional Neural Network," Frontiers in Plant Science, Feb. 15, 2019, vol. 10, Article 155, 10 pages.

Mortensen, et al., "Semantic Segmentation of Mixed Crops using Deep Convolutional Neural Network," CIGR-AgEng Conference, Jun. 2016, 6 pages.

Dyrmann, Automatic Detection and Classification of Weed Seedlings under Natural Light Conditions, Ph.D. Thesis, Jan. 1, 2017, 311 pages.

Potena, et al., "Fast and Accurate Crop and Weed Identification with Summarized Train Sets for Precision Agriculture," In: Genetics and Evolutionary Computing: Proceedings of the Twelfth International Conference on Genetic and Evolutionary Computing, Dec. 14-17, 2019; Changzhou, Jiangsu, China Jan. 1, 2017, vol. 531, pp. 105-121.

* cited by examiner

SYSTEM AND METHOD FOR DETERMINING DAMAGE ON CROPS

CROSS-REFERENCE TO RELATED APPLICATIONS

This application is a national stage entry of International Application No. PCT/EP2020/083199, filed on Nov. 24, 2020, which claims the benefit of European Application No. 19213250.4, filed on Dec. 3, 2019, the disclosures of which are hereby incorporated by reference herein in their entireties.

TECHNICAL FIELD

The present invention generally relates to electronic data processing, and more particularly, relates to image processing methods, computer program products and systems for determining damage in agricultural fields after herbicide application.

BACKGROUND

In crop farming, often the reduction of weeds in an agricultural field is pursued by applying respective herbicides in the field. In the context of this document, crop means a desirable plant which is intended to be grown and/or harvested. Herbicide means an active ingredient that kills, suppresses, controls, or otherwise adversely modifies the growth of plants. Non-crop includes weeds. Weed means any undesirable plant which is intended not to be grown and/or harvested, especially a plant which is intended to be controlled by a herbicide. However, the application of herbicides may also cause damages to the crop plants in the field. In the context of optimizing the crop yield in farming it is important to estimate the effect of herbicides on the crop plants in order to minimize the damages in the crop. In the past, deep learning based image analysis approaches were used to analyze the state of plants in agricultural fields.

A survey of deep learning applications in agriculture can be found in "Deep learning in agriculture: A survey" (Kamilaris and Prenafeta-Boldú, 2018, Comput. Electron. Agric. 147, 70-90). Recently disease identification has been tackled by deep learning based techniques in "Deep convolutional neural networks for mobile capture device-based crop disease classification in the wild" (Picon et al., 2019, Comput. Electron. Agric. 161, 280-290).

However, currently herbicide impact assessment is performed visually by expert people. Such a manual assessment always depends on the experience of the individual expert which does not allow for an objective and accurate quantitative assessment of the damages caused by herbicides.

SUMMARY

There is therefore a need for tools which support an objective and accurate quantitative assessment of the crop damage caused by herbicides.

This problem is solved by a multi-staged solution based on deep learning techniques in combination with image processing methods to estimate the damage on crop plants after herbicide application. Different damage types (e.g., necrosis, leaf curling, bleaching, etc.) that are known as a consequence of herbicide application are identified and quantified for a particular crop (e.g., corn, wheat, etc.). For example, necrosis is a form of cell injury which results in the premature death of cells in living tissue by autolysis. Necrosis is caused by factors external to the cell or tissue, such as infection, toxins, or trauma which result in the unregulated digestion of cell components. Therefore, necrosis can occur as a consequence of herbicide application. Leaf curling is a plant disease characterized by distortion and coloration of leaves and is also caused by herbicides. Such damages typically lead to severe reduction in the amount of leaves (biomass reduction) and the fruit produced by the crop.

The proposed multi-stage deep learning solution initially segments the crop in an image of the agricultural field, and in a second phase the damage is identified and segmented only in such regions of the image which represent crop plants. Damages in other plants (e.g., weeds) are ignored. Finally, the damage percentage is quantified in relation to the image area representing crop plants.

Embodiments of the invention relate to a computer implemented method for determining damage on crop plants in an agricultural field after herbicide application, a respective computer program product and a computer system which is configured to execute the computer implemented method when executing said computer program product.

In one embodiment, the computer system for determining the damage on crop plants in an agricultural field after herbicide application includes an interface to receive an image representing a real world situation in the agricultural field after herbicide application. The image includes a representation of at least one crop plant. The at least one crop plant can be a healthy plant or it may show damage symptoms of one or more damage types.

Examples of typical damage types are necrosis and leaf curling. However, symptoms of other damage types, such as bleaching, may be included, too. For example, the received image is taken by a camera with a resolution that is high enough to visualize the damage symptoms on the crop plants. Typically, the image includes representations of multiple crop plants, soil and non-crop plants corresponding to other green plants (e.g., weeds). For example, the image may be recorded by a camera mounted on a drone while the drone is flying over the agricultural field. In another example, the image may be taken with a camera of a mobile device (e.g., a smart phone) by a human user (e.g., a farmer). In general, it may be advantageous to position the camera to generate a two-dimensional zenithal view of a part of the agricultural field. When images are taken by the camera, the maximum distance between the camera and the crop plants for providing sufficient details regarding the damage symptoms on the crop plants depends on the image resolution of the camera. When using a camera with high resolution the distance between the crop plants and the camera can be chosen bigger than when using a camera with lower resolution (assuming a fixed focal length of the camera). That is, a camera mounted on a drone which, while flying over the field, has a higher distance to the crop plants than a camera mounted on a tripod in the field, typically needs a higher resolution to provide the same level of accuracy regarding the damage symptoms represented in the image.

Typically, the image size of such original high resolution images taken by the camera is between 3000×4000 pixels and 4000×6000 pixels. In the following the images are to be processed by convolutional neural networks (CNN). However, the image size which can be processed by a CNN is limited by the memory of the Graphical Processing Unit (GPU) used for processing the CNN. A typical memory size of a GPU is 12 GB. This memory size is not sufficient to process such high resolution images with CNNs. Therefore, the system includes an image pre-processing module to adjust the image size (in pixels) of the received image to a rescaled image matching the size of an input layer of a first fully convolutional neural network, referred to as the first CNN. Preferably, the rescaled image is reduced in size (compared to the received image) but the damage symptoms associated with any type of damage remain still visible (i.e. identifiable) on the rescaled image. For example, early-stage necrosis symptoms are small white spots occurring on the crop leaf surface. The resolution of the rescaled image should still be high enough to clearly visualize such spots.

The first CNN is configured to perform semantic segmentation for the rescaled image. For this purpose, the first CNN has been trained using a first loss function to measure the performance of the first CNN to segment the rescaled image into crop portions and non-crop portions. Examples of non-crop portions can be representations of soil and other green (non-crop) plants (e.g. weeds). For example, crop leaves with late-stage necrosis can easily be confused with soil. Therefore the trained first CNN reliably distinguishes soil from necrosis. The semantic segmentation by the first CNN provides a first segmented output indicating image portions of the rescaled image belonging to representations of crop.

For the following analysis it is only important that all pixels in the rescaled image which belong to parts of the crop plants (crop portions) are identified. For this reason it is sufficient to classify all remaining pixels into the non-crop category. In one embodiment, the non-crop related pixels may relate to a "soil" class and "other green plants" categories (classes) (e.g., bundling all weeds). This may provide for a better distinction between soil and necrosis related pixels. Other embodiments may use further categories for distinguishing between different types of the other green plants (e.g., different weed types).

In general, fully convolutional neural networks are known to solve semantic segmentation problems. Such semantic segmentation CNNs predict the class the pixels of an image belong to and assign a single value label to every pixel. Possible embodiments of the first CNN include convolutional neural network topologies which are appropriate for the solution of segmentation tasks, including but not limited to: Fully Convolutional Dense Net, UNet, and PSPNet (Pyramid Scene Parsing Network). For example, for training the first CNN, the first loss function may be "categorical_crossentropy". As the segmentation problem for the first CNN is a mutually exclusive classes problem, the activation of the last layer of the first CNN can advantageously be a "softmax" activation function.

The computer system further has a second fully convolutional neural network, referred to as the second CNN, which performs a further semantic segmentation of the rescaled image by taking into account the first segmented output of the first CNN. The first segmentation output acts like a filter function for the second CNN in that only such image portions of the rescaled image are processed by the second CNN which relate to crop portions with pixels belonging to representations of crop identified by the first CNN. In other words, the first segmented output can be seen as a mask which is used to identify the crop portions in the rescaled image. The second CNN further segments such image portions of the rescaled image which were identified as representations of crop in the first segmented output. The result of the further segmentation is provided in a second segmentation output. The second CNN may be advantageously trained using a second loss function appropriate to measure performance of segmentation by the second CNN with unbalanced classes. It is to be noted that the second CNN needs to be able to distinguish between different damage types which can even be present in a single pixel of the respective image. Leaf curling and necrosis appear very different in their early and late stages which results already in four damage types. Bleaching (coloring) can also occur in different facets as the skilled person knows (white, purple, yellow). That is, the semantic segmentation problem cannot be solved by a simple classification network. Rather, multiple classes need to be identified where even a single pixel may belong to two different damage types simultaneously (necrosis and leaf curling—a leaf can be curled or deformed and show necrosis symptoms at the same time). Hence, the second CNN is trained using an appropriate loss function to distinguish non-exclusive classes.

The second CNN is thereby trained to further segment the identified crop portions of the first segmented output into one or more sub-portions with each sub-portion including pixels associated with damaged parts of the crop plant showing a respective damage type. When applying the second CNN to the crop portions of the rescaled image, damaged parts are identified by damage type in a second segmented output, in case that damage symptoms are present on the identified crop portions. Thereby, the second CNN can be trained to distinguish between early and late necrosis symptoms as well as to distinguish between early and late leaf curling. In fact, the second CNN can be trained to distinguish between any kind of damage symptoms by selecting respective training images for the training data set.

Again, for the second CNN, a standard convolutional neural network topology may be selected, such as for example, Fully Convolutional Dense Net, UNet, PSPNet, or other segmentation topologies known in the art.

Typically, the training data available for a real agricultural field after herbicide application, show an imbalance between the number of available images showing symptoms of different damage types. In other words, the number of training images with a first damage type may be significantly higher than the number of training images with a second damage type. For example, the number of images with necrosis symptoms may exceed the number of images with leaf curling because the impact of the herbicide application causes more damage with regards to necrosis than with regards to leaf curling. The loss functions: mean squared error loss, dice loss, generalized dice loss, focal loss, or Tversky loss are known as suitable loss functions to achieve high accuracy segmentation when training the second CNN with such unbalanced classes. Best results were achieved using Tversky loss. It is to be noted that the segmentation problem of the second CNN is not necessarily a mutually exclusive classes problem because a crop leaf suffering from leaf curling may also show symptoms of necrosis. That is, a single pixel may belong to multiple damage types.

Further, the computer system includes a damage measurement module to determine a damage measure for the at least one crop plant for each damage type based on the respective sub-portions of the second segmented output ($20s2$) in relation to the crop portion of the first segmented output. It is to be noted that in case the at least one crop plant is a healthy plant which shows no damage symptoms at all the corresponding damage measure is zero for all damage types.

For example, the measure of damage can be the percentage of crop plant related pixels which belong to plant portions showing damage symptoms of a respective damage type in relation to the number of pixels in the identified crop portions. It has been proven that the damage measures obtained by the disclosed system are significantly more accurate than visual assessment values provided by experts in the field. The damage assessment is an important indicator for the farmer regarding any further field treatment including further herbicide applications.

The training data set for training the first CNN includes images with healthy crop plants, images with damaged crop plants wherein there are damages of different damage types, and images with damaged or healthy crop plants and other green plants. In contrast, the training data set for training the second CNN only includes images with damaged crop plants with damages of different damage types (with or without other green plants). No healthy plant images are used for training the second CNN. For example, the training data set for the second CNN can be a sub-set of the training data set of the first CNN with damaged crop images only.

One issue in training the first CNN (crop plant segmentation) is how to manage data augmentation in the training process for achieving a better trained system. In general, such data augmentation procedures are mainly centered in performing affine transformations (e.g., rotation, flip, zoom). In the case the first CNN, the network model needs to learn that crop plants (e.g., corn) can appear in a damaged state and can present brown colored necrosis symptoms on the leaves. The region with necrosis belongs to the crop/corn. As a consequence, the first CNN has to learn that the green color is not the main feature of the crop, and shape, textures or other features have also to be considered. For example, the regions of the crop affected by necrosis appear brown colored and look like soil. It is needed to force the CNN not to learn that plants are always green, they can also appear brownish if damaged. This behavior happens in RGB color space. To make the first CNN learn this fact, in one embodiment, color transformation processes may be used in the data augmentation stages. For example, a particular subset of images of the training data set may be augmented by a transformation of said subset images (e.g., 50% or any other percentage of all training images) from the RGB color space to another color space (e.g. HSV); a random modification of intensity values of respective transformed color channels; and a transformation of the modified image parts back into the RGB color space.

Further aspects of the invention will be realized and attained by means of the elements and combinations particularly depicted in the appended claims. It is to be understood that both, the foregoing general description and the following detailed description are exemplary and explanatory only and are not restrictive of the invention as described.

SHORT DESCRIPTION OF THE FIGURES

FIG. 1 includes a block diagram of a computer system for determining the damage on crop plants in an agricultural field after herbicide application using a multi-staged CNN approach according to an embodiment;

Figure 7:
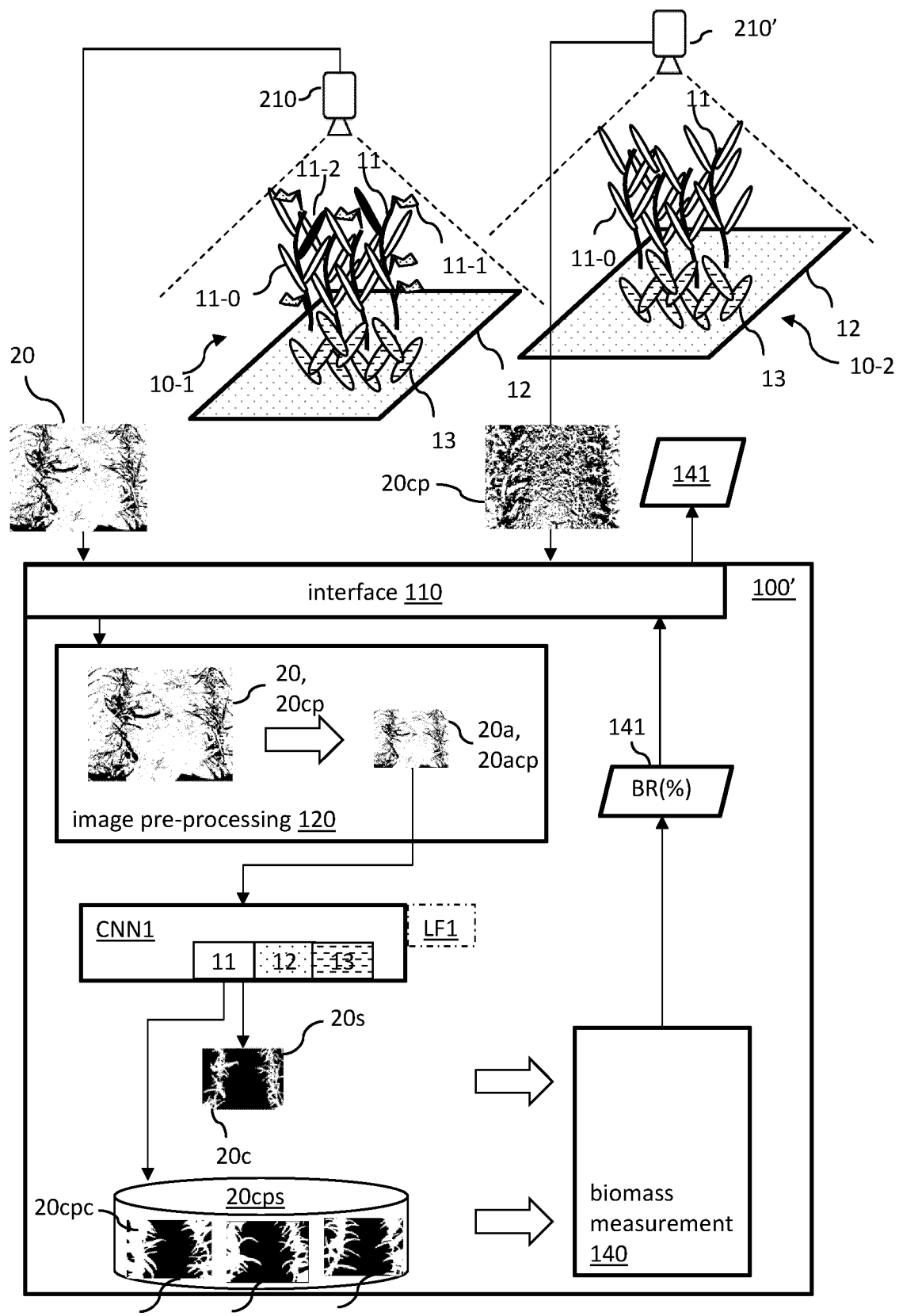
Figure 8:
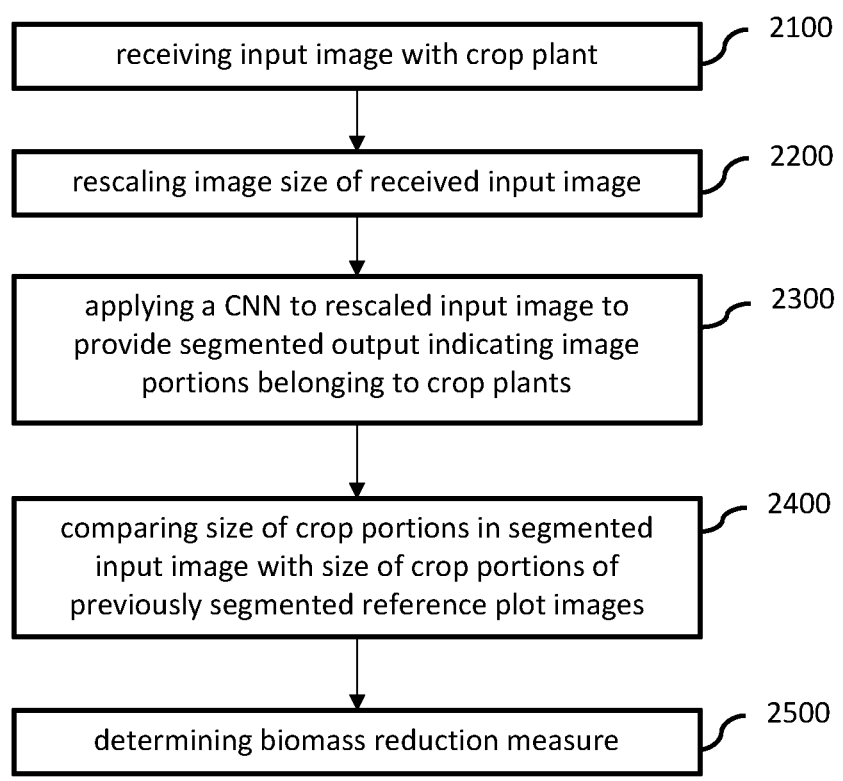
Figure 9:
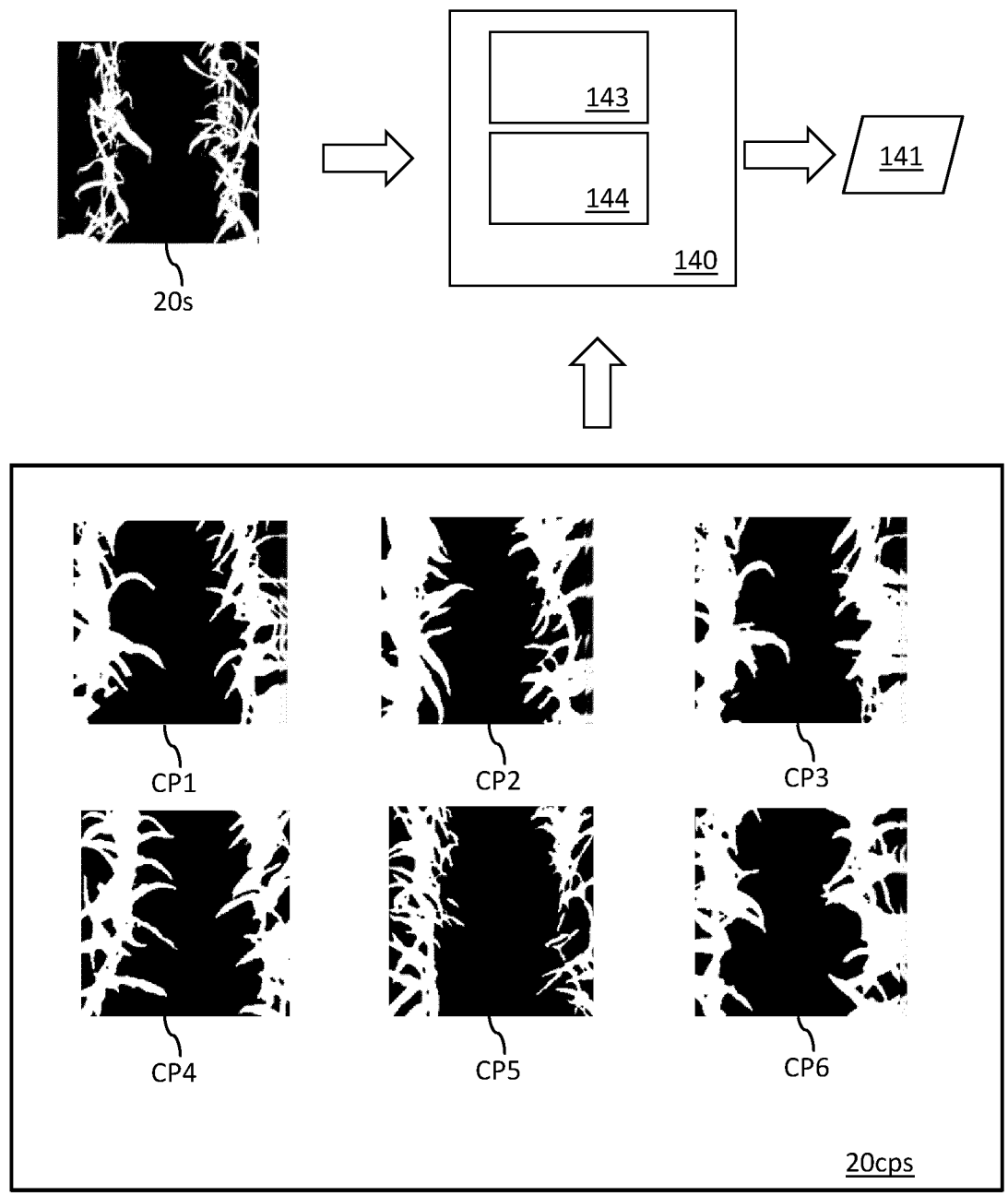
Figure 10:
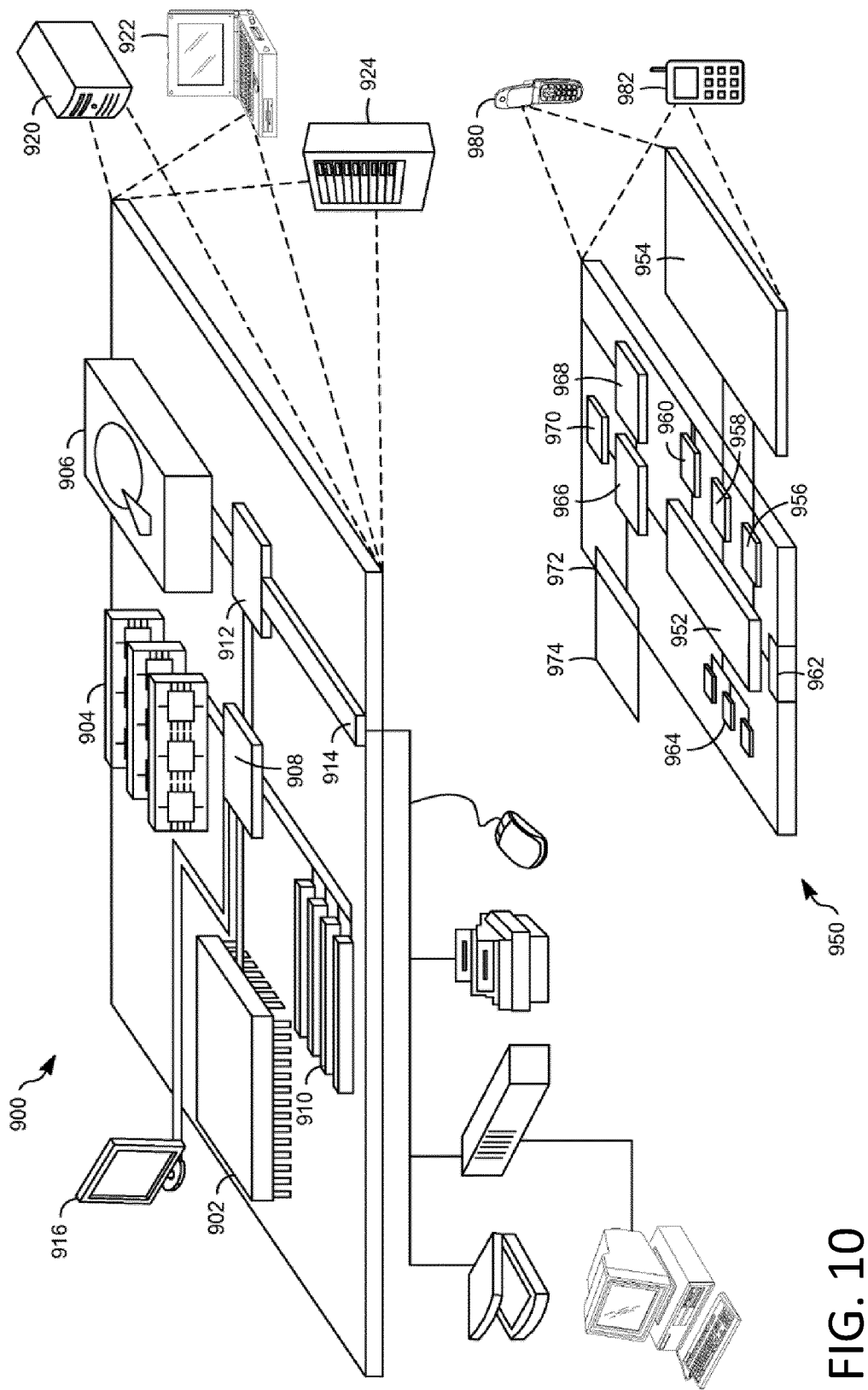
Figure 11:
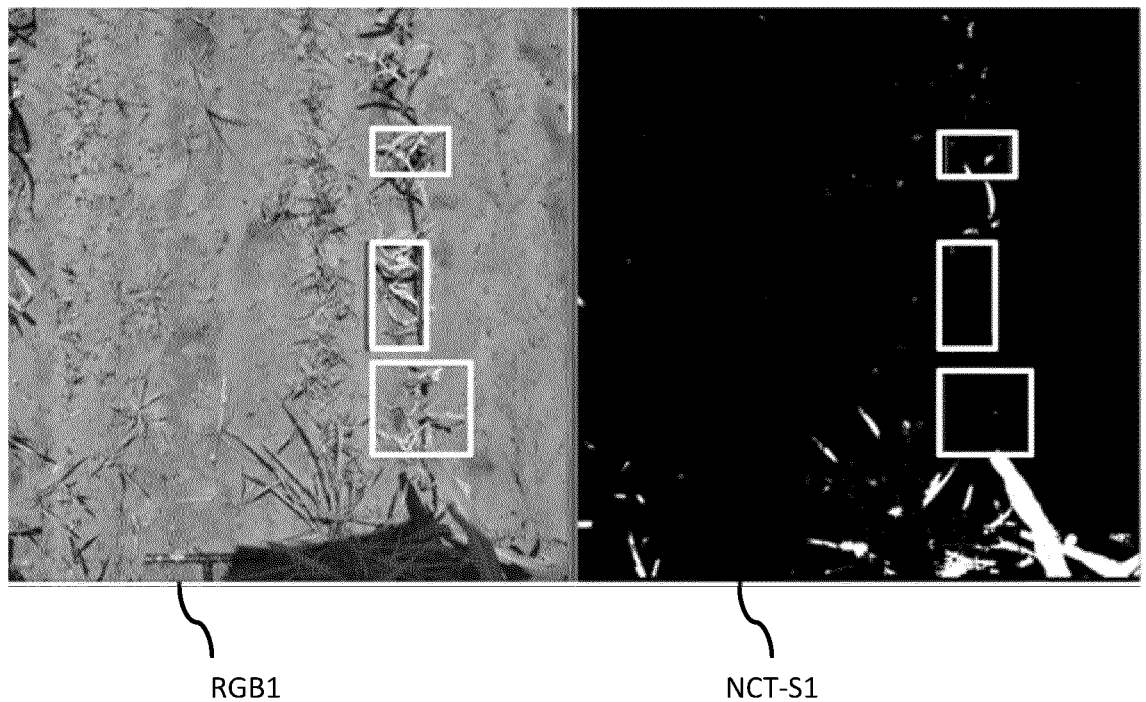
Figure 12:
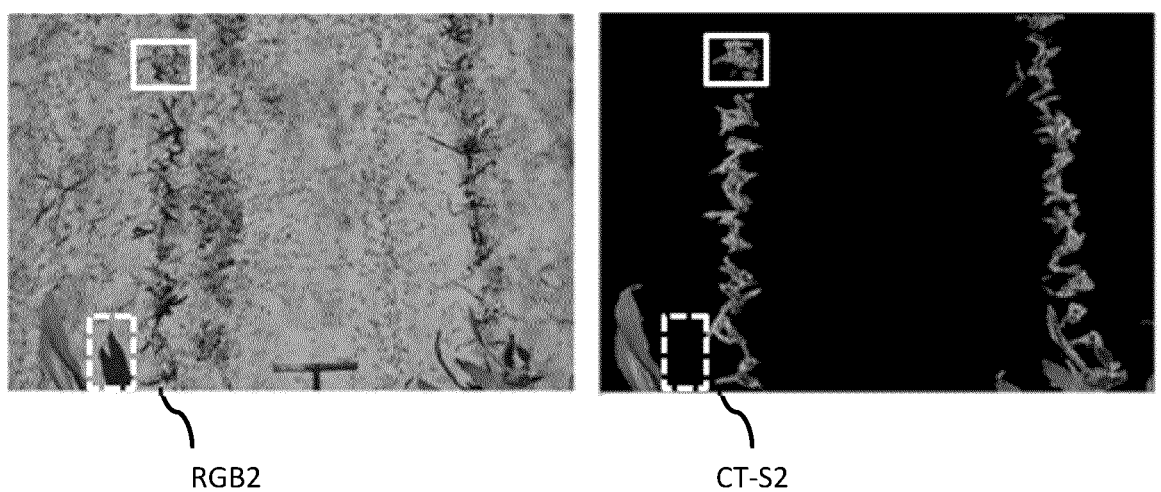
Figure 13:
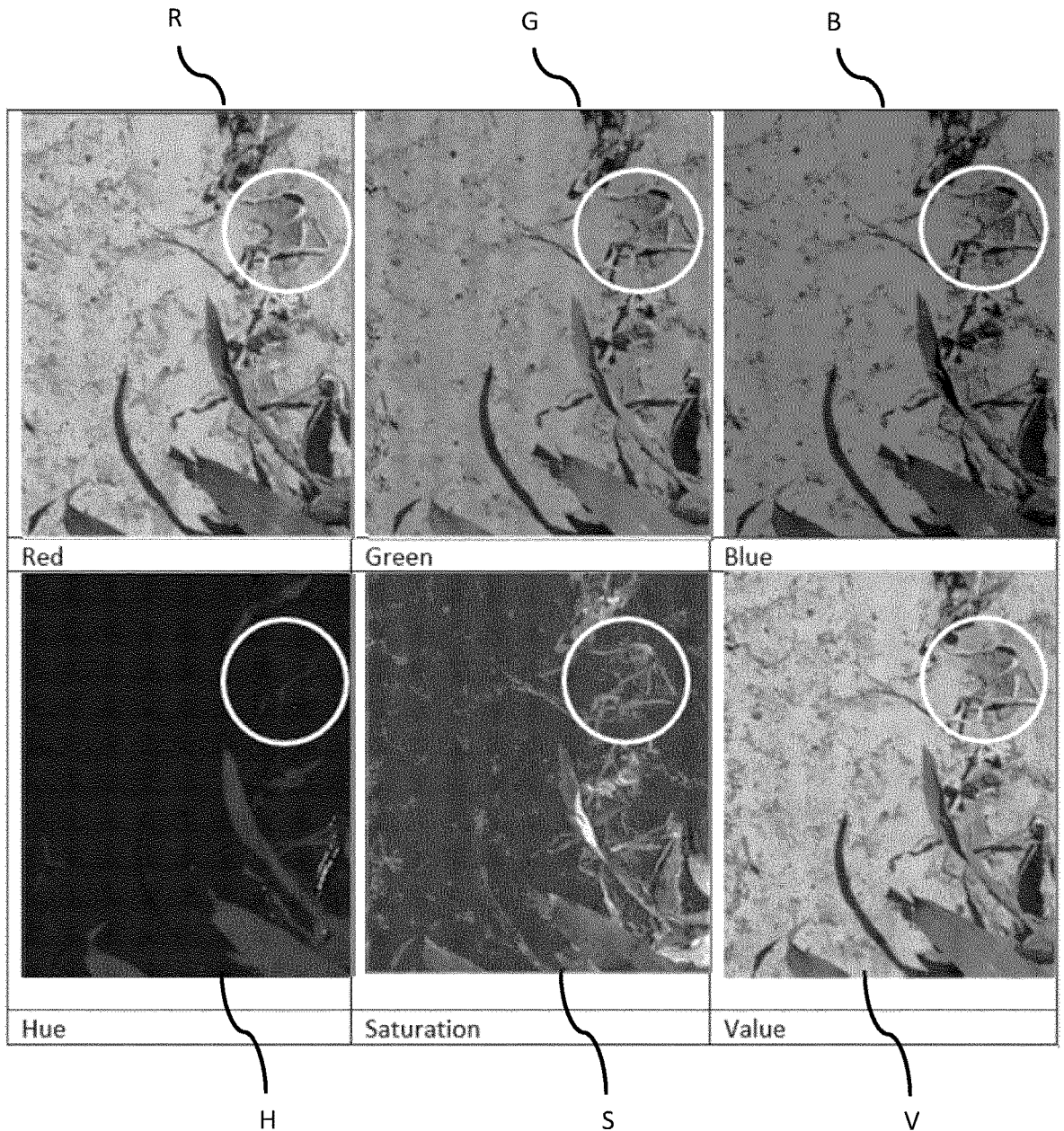
Figure 14A:
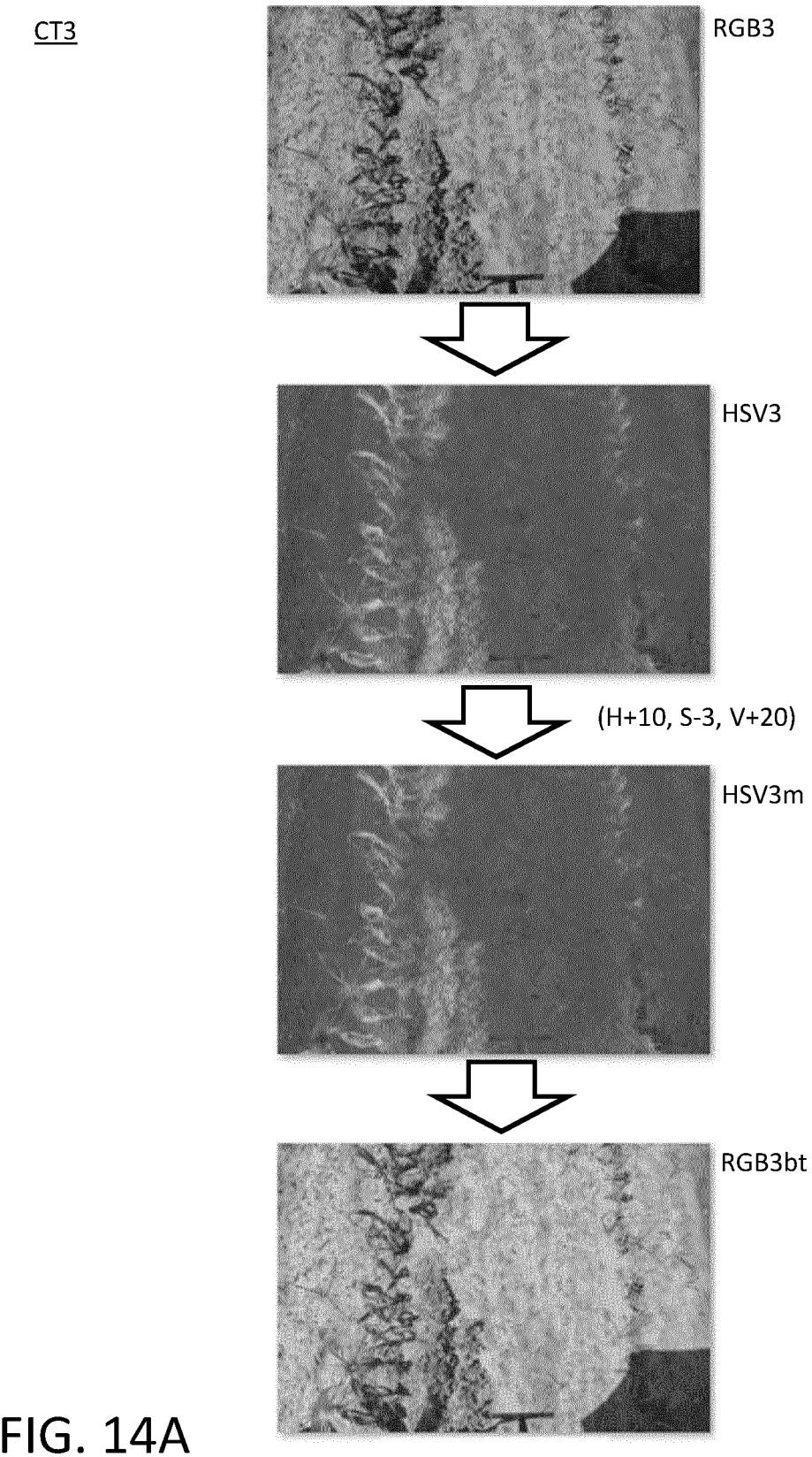
Figure 14B:
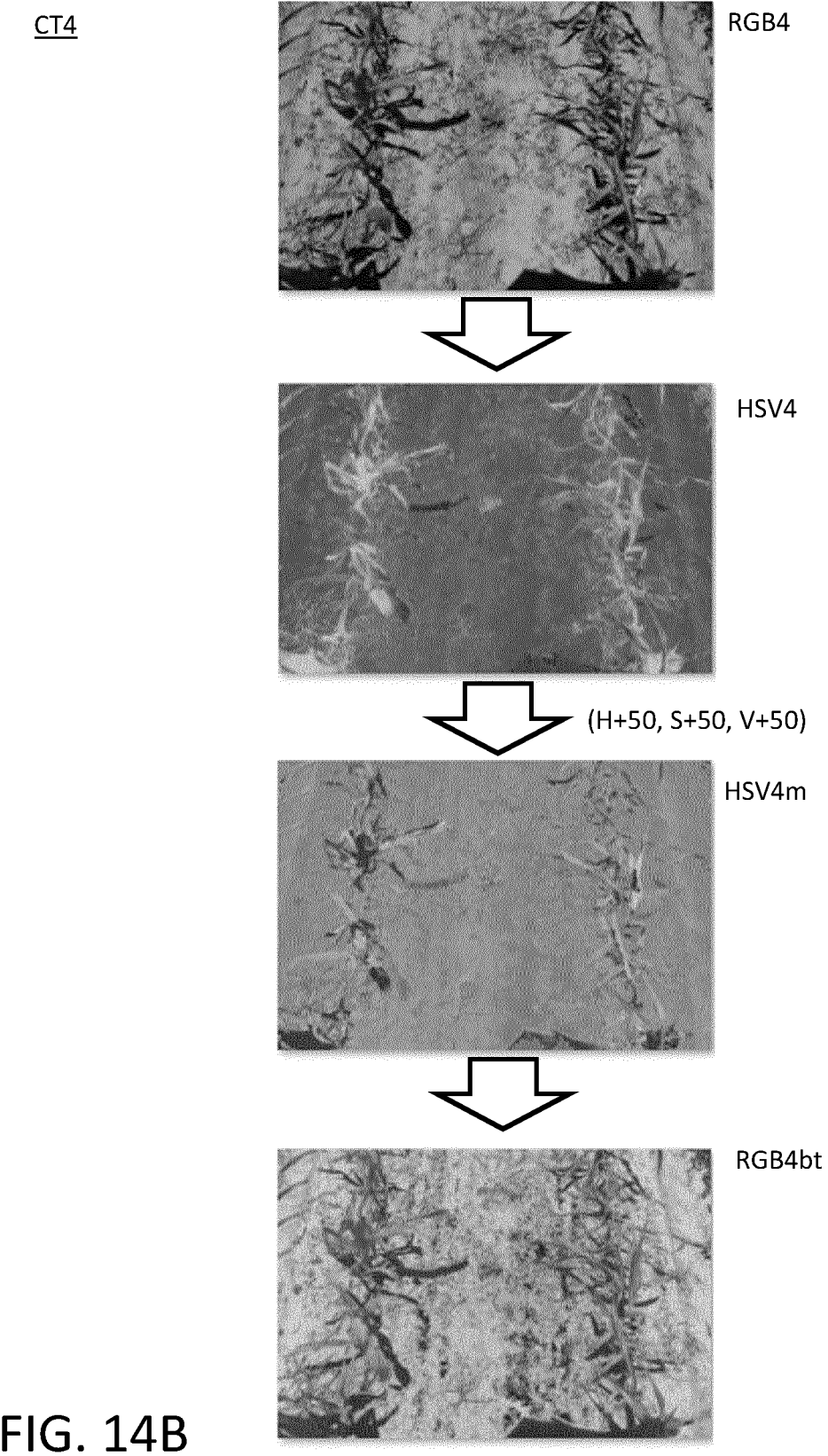

FIG. 7 includes a block diagram of a computer system for determining biomass reduction on crop plants in an agricultural field after herbicide application using a CNN approach according to an embodiment;

FIG. 8 is a simplified flow chart of a computer-implemented method for determining biomass reduction on crop plants after herbicide application according to an embodiment;

FIG. 9 illustrates a biomass reduction measure obtained by comparing a test input image with reference images;

FIG. 10 is a diagram that shows an example of a generic computer device and a generic mobile computer device, which may be used with the techniques described herein;

FIGS. 11 to 13 illustrate the effect of data augmentation using color transformation processes for a subset of training images used for the training of the first CNN; and FIGS. 14A, 14B illustrate data augmentation for two training images using color transformation.

DETAILED DESCRIPTION

Figure 1:
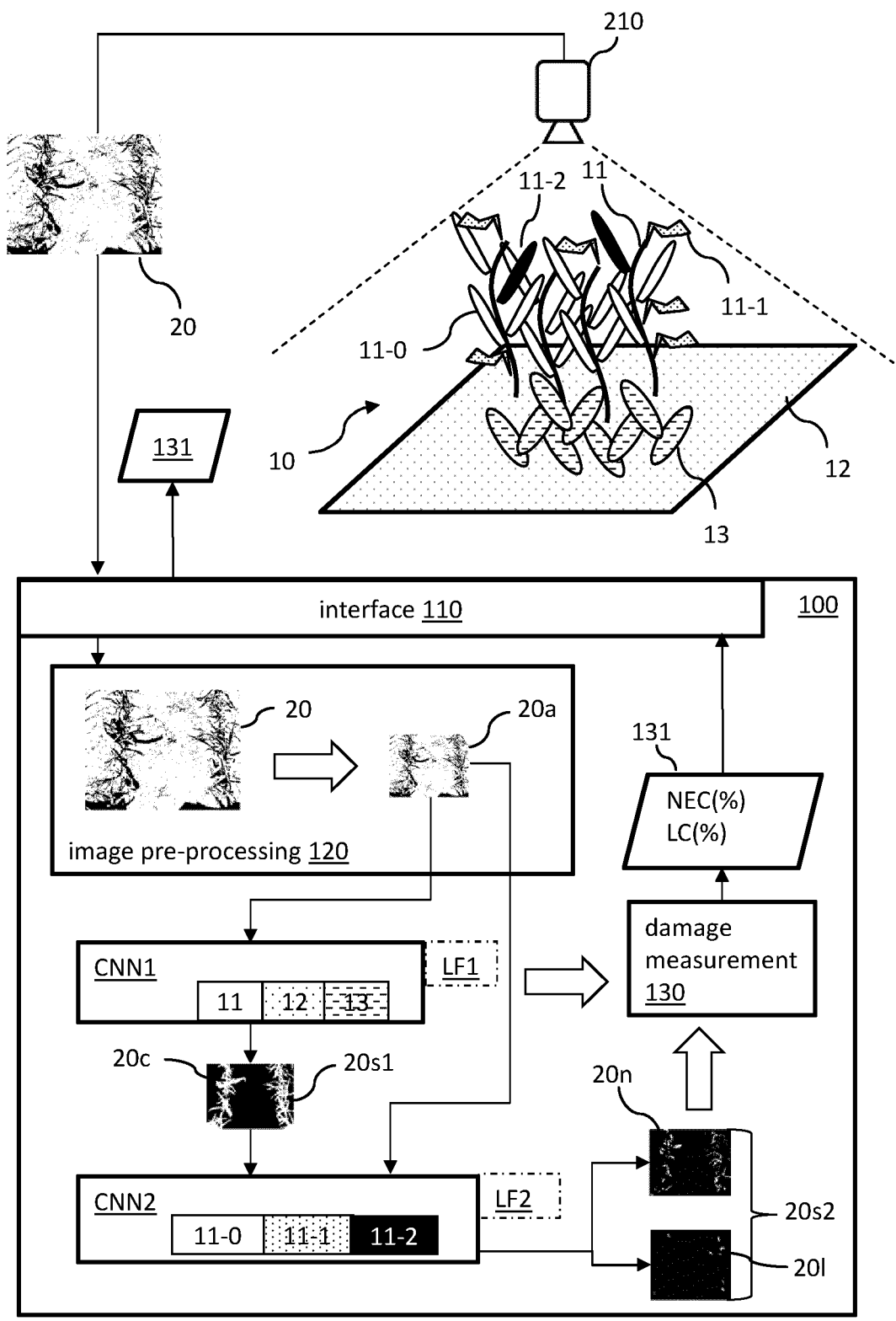
Figure 2:
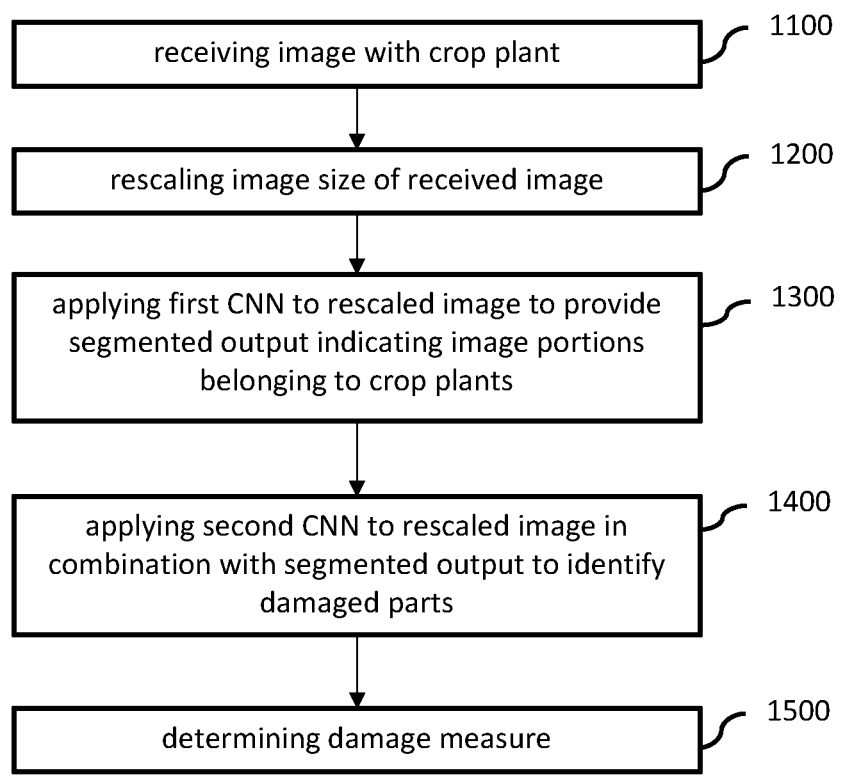
FIG. 2 is a simplified flow chart of a computer-implemented method for determining damage on crop plants after herbicide application according to an embodiment.
Figure 3A:
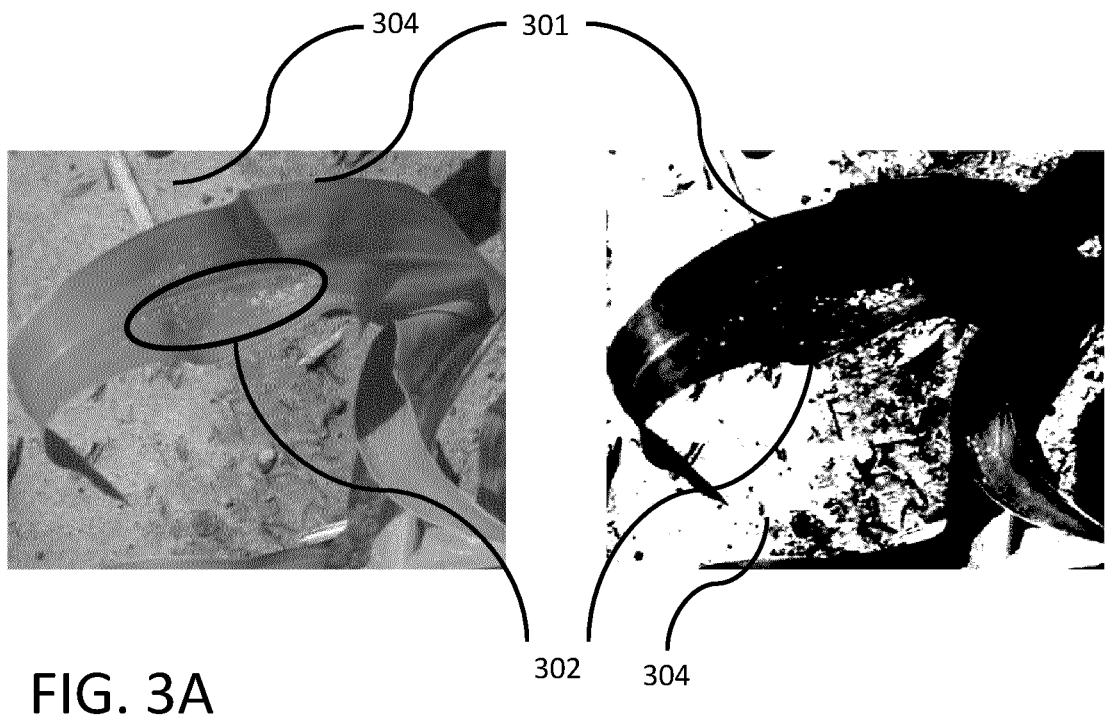
FIGS. 3A, 3B show examples of damage type necrosis in two different stages.
Figure 3B:
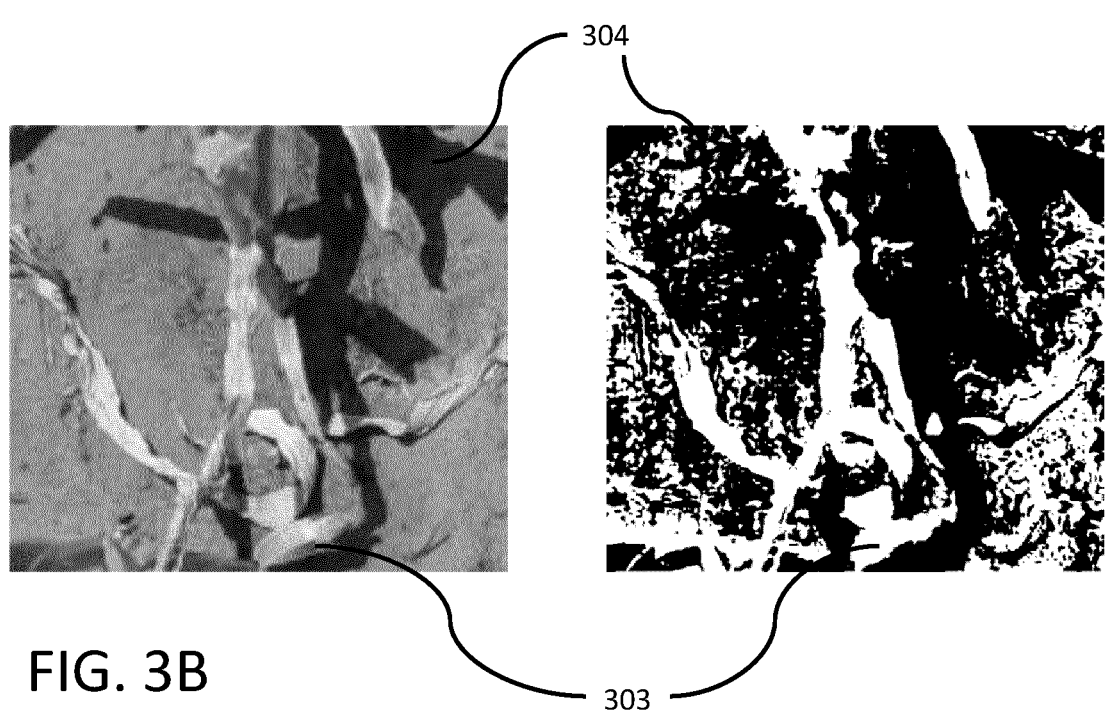
Figure 4A:
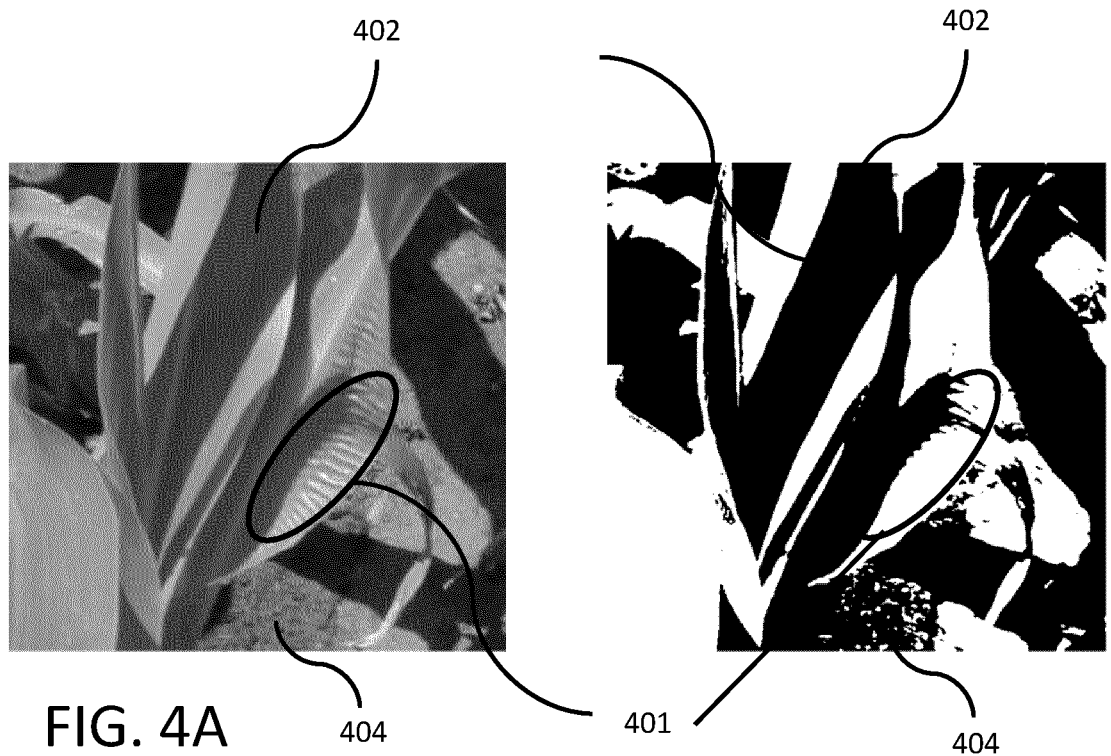
FIGS. 4A, 4B show examples of damage type leaf curling in two different stages.
Figure 4B:
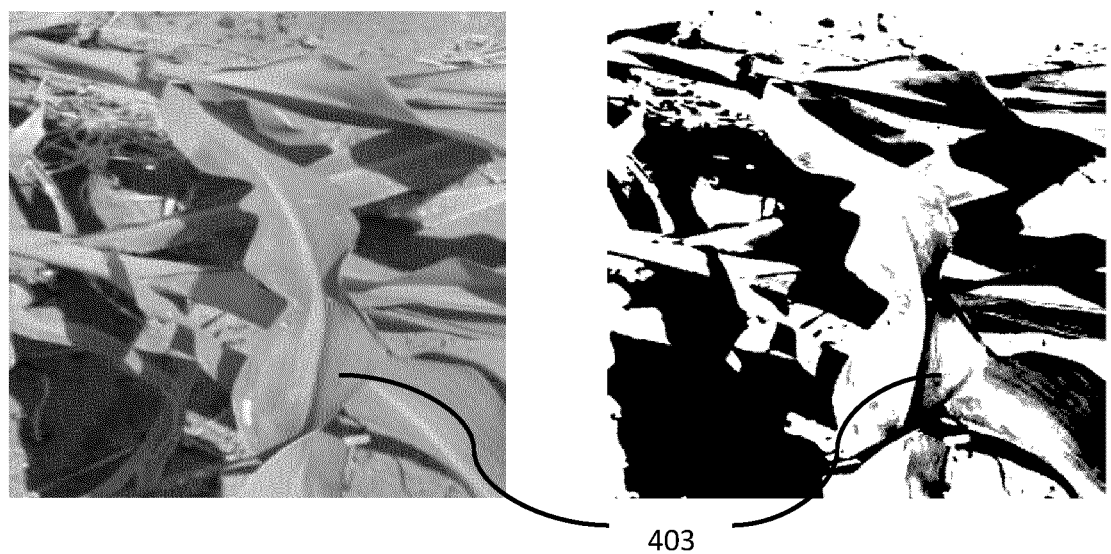

FIG. 1 includes a block diagram of a computer system 100 for determining damage on crop plants 11 in an agricultural field 10 after herbicide application. FIG. 2 is a simplified flow chart of a computer-implemented method 1000 for determining damage on crop plants after herbicide application. The method 1000 can be executed by the system 100. For this reason, FIG. 1 is described in view of FIG. 2 and the following description of FIG. 1 also refers to reference numbers used in FIG. 2.

The system 100 is communicatively coupled with an image recording device 210 via an interface 110 to receive 1100, from the image recording device, an image 20 representing a real world situation in the agricultural field 10 after herbicide application. The real world situation in agricultural field 10 is schematically illustrated by a plurality of (green) crop plants 11 which are growing on soil 12. Together with the crop plants also other green plants 13, such as weeds, can be found in the field. The green parts of crop plants 11 (e.g., leaves, stems, etc.) show different damage types. For example, crop leaves with damage type 11-1 are supposed to be infested by leaf curling, crop leaves with damage type 11-2 are supposed to be infested by necrosis. Other damage types are possible but not shown here for keeping the figure clear. Healthy parts of the crop plants are indexed with the type reference 11-0.

The image recording device typically is a digital camera device which can provide images at resolutions between 3000×4000 to 4000×6000 pixels. With such a high resolution camera the field of view (illustrated by the dashed lines) of the camera 210 can be selected to cover a relatively large area (in the order of 1×1 m$^2$) of the agricultural field 10 and still provide sufficient image details to perform the herein disclosed image analysis by positioning the camera at an appropriate distance to the crop plant(s) (e.g., approximately one meter above the crop plants). Cameras with lower resolution may still be usable when selecting a smaller field of view and getting closer to the crop plant when recording the images. It is assumed that the recorded image 20 includes a representation of at least one crop plant which may show damage symptoms of two damage types 11-1, 11-2. The image may be taken from a certain distance above the field showing crop plants 11, soil 12 and other green plants 13. For example, a camera may be mounted on a pillar/tripod located in the field, or it may be taken by a camera carried by a drone while flying over the field. It is also possible that a human user (e.g., the farmer) takes a picture with a smartphone camera device from an elevated position (e.g., from a tractor seat).

The recorded image is sent to the computer system 100 where it is further processed. In a first step, the received image 20 is adjusted 1200 by an image pre-processing module 120 of the system. The image pre-processing module adjusts the size of the received image and generates a rescaled image 20a which matches the size of an input layer of a first fully convolutional neural network CNN1 of the system. Because of the limited memory of GPUs used for implementing CNNs, images of the size of the original received image can typically not be processed by a CNN. Therefore a reduction in size or a split of the image into multiple tiles is necessary. It was recognized that a separation of the original image 20 into tiles is leading to poor segmentation results of the neural networks used by the system 100 because in images containing crop (e.g. corn) in late growth stages it can happen that a single tile is entirely green but there is no other information about the plant to which the green surface belongs to. Therefore, it would be impossible to classify such an entirely green tile in a meaningful way.

The image preprocessing module 120 is introduced to reduce the size of the received image to the appropriate size for the input layer of CNN1. In experiments, a reduction to very small image sizes with 224×224 pixels for the above mentioned covered areas in the order of 1×1 $m^2$ turned out to be insufficient to provide accurate results for low damaged crop regions. A reduction to an image size of 512×512 pixels turned out to be sufficient for many situations. However, the validation of the disclosed approach was made based on a reduction of the images to a size of 768×768 pixels which turned out to be a resolution where also early stages of necrosis and leaf curling remain visible. Visible in this context refers to the ability of the following image processing steps to identify these damage types in the rescaled image. In other words, the input to CNN1 is the rescaled image 20a with a lower resolution compared to the resolution of the original received image 20.

CNN1 has been trained to segment the rescaled image 20a into crop 11 and non-crop 12, 13 portions. For example, the non-crop portions may include a portion with pixels associated with soil and a portion with pixels associated with other green (non-crop) plants. When applying 1300 the trained CNN1 it provides a first segmented output 20s1 indicating the crop portions 20c of the rescaled image with pixels belonging to representations of crop. The first segmented output 20s1 serves as mask over the rescaled image to generate the input to a second fully convolutional neural network CNN2. Multiple segmentation topologies, including Fully Convolutional Dense Net, UNet, and PSPNet have been used. The most advantageous results were achieved with the Fully Convolutional Dense Net topology. As shown in FIG. 1, there can grow more plants species in the field than just the crop plants such as corn. Such other plant species can include broad and narrow leaf plants and grass. This may lead to five different classes if considering soil as another class. A reduction of the number of classes is proposed since only crop segmentation is needed as a result from the first segmentation stage performed by CNN1. Therefore, all other plant species different from the crop species in the field can be grouped together as "other green plants". As a consequence, three classes are proposed as output of CNN1: corn, soil and other green plants. As this segmentation is a mutually exclusive classes problem, the activation of the last layer of CNN1 can be a "softmax" activation. The loss function LF1 used for training CNN1 can be a "categorical_crossentropy" loss. No fine tuning needs to be applied. CNN1 can be trained from scratch, with no parameters and weights in the CNN being inherited from other experiments, such as 'ImageNet'. In a particular implementation, CNN1 was trained based on an image data set which included 1086 images from which 814 images were dedicated for training, 108 images for validation and 164 images for testing purposes. The dataset included images showing healthy crop plants (corn) and images showing damaged crop plants (corn) with at least a portion of the training image data set showing also other green (non-crop) plants. Of course, CNN1 can easily be trained for segmenting other crop plants with an appropriate training dataset by using the same training methodology for other crop types.

Figure 5A:
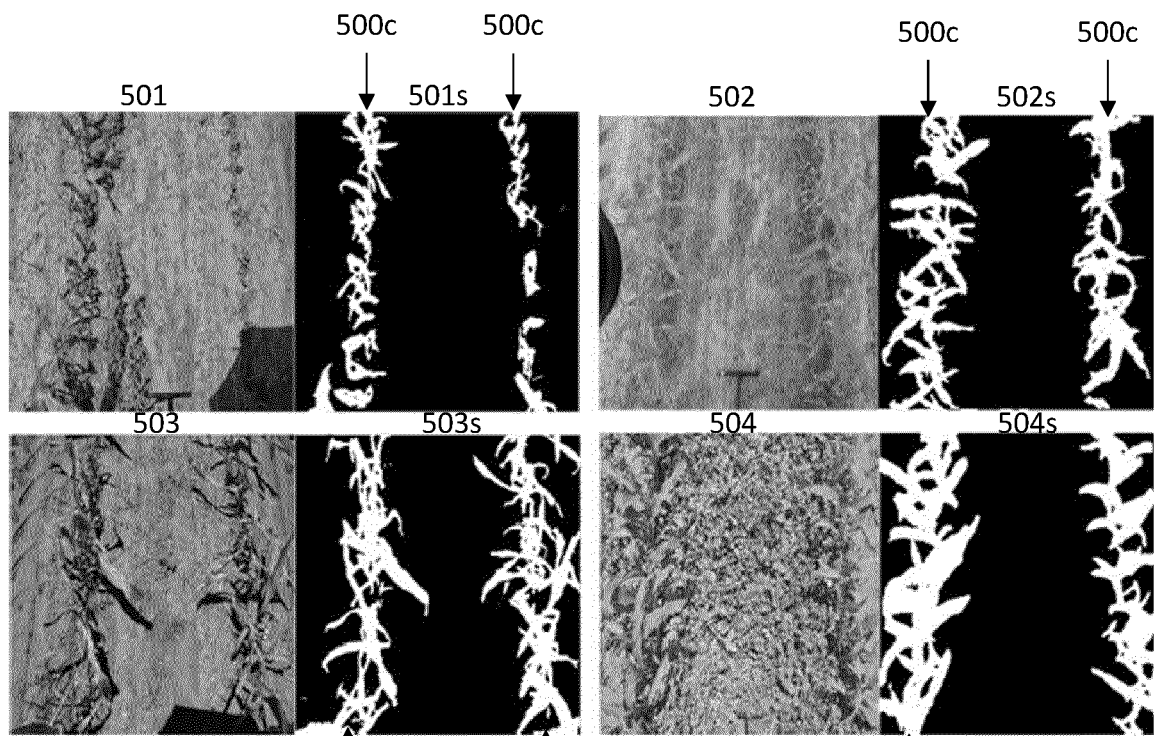
FIGS. 5A, 5B illustrate crop segmentations results for four real world situations as achieved by a trained first CNN according to an embodiment.
Figure 5B:
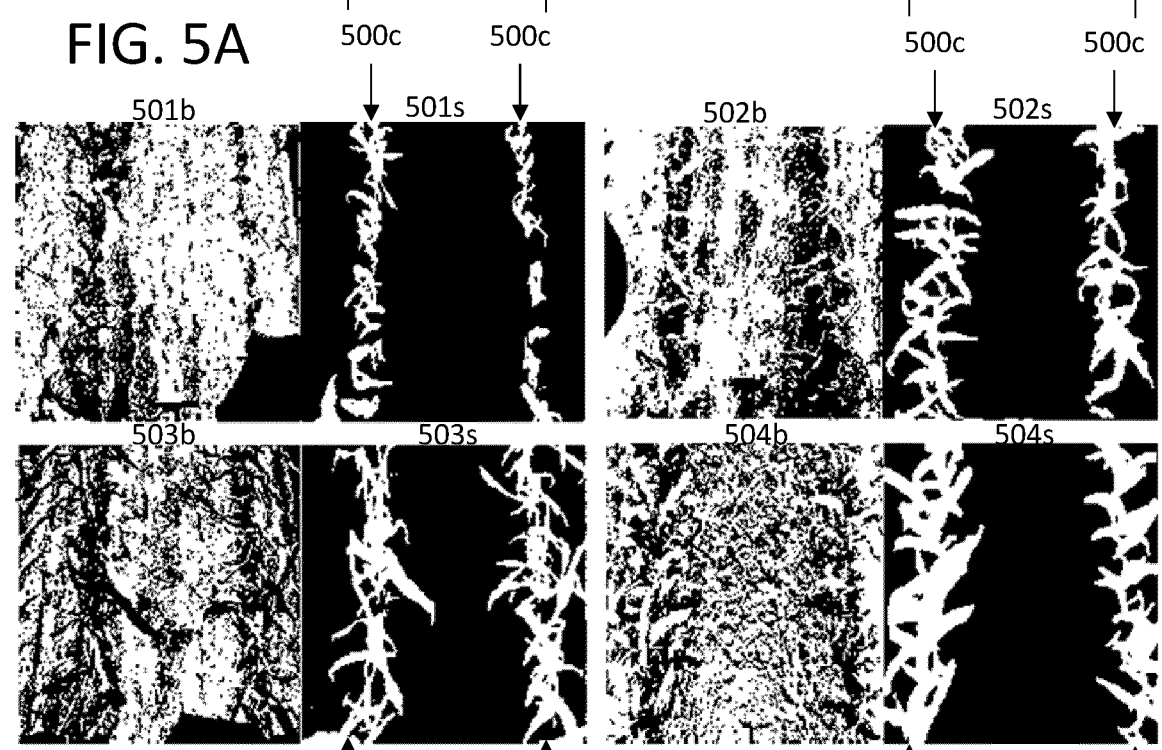

FIGS. 5A, 5B illustrates crop segmentations results achieved by the trained CNN1 for four real world situations 501 to 504 in the field. Thereby, FIG. 5A illustrates more realistic grey scale images of the field whereas FIG. 5B includes simplified black and white versions 501b to 504b of the same images (with the labels on the top of the respective images). On the right to each image the corresponding segmentation result 501s to 504s is shown with the white areas representing the pixels which have been segmented as belonging to crop plants (crop portions 500c). All images 501/501b to 504/504b show two rows of crop with different backgrounds. In 501, 503 the background primarily consists of soil and some weed plants whereas in images 502, 504 a much higher portion of the image is covered by weeds.

Images 501/501b show two rows of crop plants where the right one is heavily damaged by necrosis. Further, weeds are present to the lower right of the left line with crop plants. In 501s the pixels in relation to the crop plants are correctly indicated including the plants suffering from necrosis whereas all weed plants are filtered out by CNN1. Even for the images 502/502b and 504/504b the segmentation results 502s, 504s accurately indicate the crop portions in the images despite the high percentage of weed related pixels.

As it can be appreciated from the examples in FIGS. 5A, 5B, CNN1 can deal with non-uniform illuminations in the image. In fact, it can segment the corn plants shown in FIGS. 5A, 5B properly even when it is placed under the shadow of an umbrella placed in the field. The real shadows due to sunlight are perfectly dealt, as well. The model can segment correctly the corn when it is isolated in the field and when there are other weeds overlapping the corn leaves. Even in image 504/504b, where all plants are green colored, the model has been capable of identifying the proper shape and layout of the corn. Necrotized regions which are brown colored and that were wrongly understood by prior art models are now correctly segmented, and perfectly distinguished from the soil.

Figure 6:
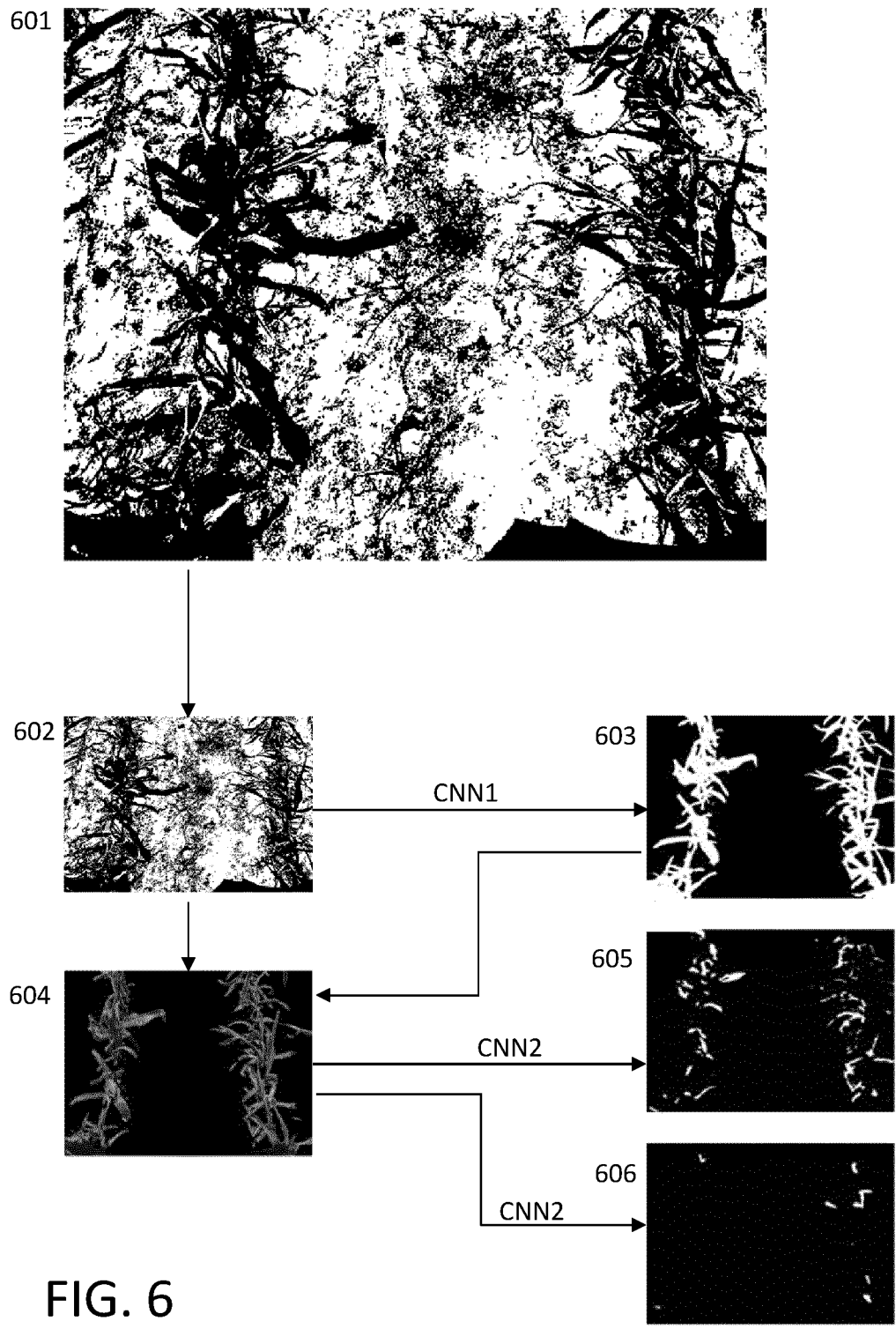
FIG. 6 shows the different stages of image processing from a received high resolution image to damage segmentation portions by damage type.

Returning now to FIG. 1, the next stage in the multi-stage deep learning architecture is formed by second CNN (CNN2). CNN2 receives as inputs the first segmented output 20s1 of CNN1 with the indicated crop portions 20c and the rescaled image 20a. The crop portions 20c are used as a filter to identify in the rescaled image only such pixels which belong to crop plants. CNN2 is then applied 1400 only the crop plant related pixels of the rescaled image. Turning briefly to FIG. 6, the original received image 601 (simplified black and white version) is reduced into the rescaled image 602. After the application of CNN1 to image 602 the first segmented output 603 is generated indicating the crop portions. 602 and 603 now serve as input for CNN2. The combination of 602 and 603 results in the filtered rescaled image 604. The colors are different in this representation to indicate that this is not just a black and white representation but a representation of the crop portions with all image details required for the damage analysis stage. Finally, the application of CNN2 results in the identification of the damaged crop plant portions (indicated as white pixels in the second segmentation output with the images 605, 606).

Turning back to FIG. 1, CNN2 has been trained to segment said crop portions of the rescaled image into the second segmented output 202s with one or more sub-portions 20n, 201 wherein each sub-portion includes pixels associated with damaged parts of the crop plant showing a respective damage type 11-1, 11-2. In the example, the image with the sub-portion 20n (cf. image 605 in FIG. 6) illustrates pixels infested by necrosis as white pixels, and the image with the sub-portion 201 (cf. image 606 in FIG. 6) illustrates pixels infested by leaf curling as white pixels.

As already explained earlier, since some damage symptoms are quite small in their early stages, a too strong image size reduction is not advisable because it could risk the disappearance of image details necessary for CNN2 to recognize pixels belonging the various damage types. It was further already mentioned working with the full sized received images as input is not feasible. On the one hand, the full image cannot be processed by a convolutional neural network with the currently available typical hardware because it is too big to be supported by the GPU's memory. On the other hand, a full image size as input would imply that the network model must have many layers to appreciate the details of early stages of necrosis or leaf curling into their receptive fields. Therefore, the image size is adjusted as described earlier (e.g., the size of the input image may be established at 768×768 pixels). The CNN2 output in the example of FIG. 1 is defined as a 3 channels image, one for necrosis label 11-1, one for leaf curling label 11-2 and one for the rest 11-0 (neither necrosis or leaf curling). Necrosis in late stages has the same or similar color as soil, and for this reason it was appropriate to isolate the area of damage detection with the CNN1 as much as possible. This allows CNN2 now to perform semantic segmentation for damage location only over the segmented crop pixels which avoids confusion between necrosis and soil related pixels.

The CNN2 model for damage detection can be any fully convolutional model usable for segmentation of images. Several networks topologies well known by the skilled person were tested including: UNet, DenseNet and Pyramid Scene Parsing Network (PSPNet). Last layer activation, loss function and output channels were adapted to the problem of damage detection. In cases where there is no overlap of different damage types in the crop portions the last layer can have a 'softmax' activation, since classes are then mutually exclusive. In cases where there is an overlap (e.g., there are necrosis spots on a curled leaf) a 'sigmoid' activation may be used for the last layer.

A critical problem may arise from unbalanced classes. In a current study used for the validation of the multi-stage deep learning approach as disclosed herein, the number of images showing necrosis was much higher than the number of images showing leaf curling symptoms. This imbalance has been measured in terms of number of pixels, and the relation was 1:33.63 for leaf curling regarding necrosis. Of course, the training image data set may be cleaned to have a good balance between the number of images in relation to the various damage types. However, when dealing with unbalanced training data the CNN2 model may learn to properly detect one damage type (where many training images were available) but the learning regarding damage types which are underrepresented in the training data may be poor. For example, with the used training data set there is the risk that CNN2 learns to detect properly necrosis but not leaf curling. Unbalanced segmentation is being dealt in the literature (cf., Kervadec, H., Desrosiers, C., Granger, E., Dolz, J., Ayed, I. Ben, 2019. Boundary loss for highly unbalanced segmentation, in: Machine Learning Research. pp. 1-12.)

The proper management of unbalanced segmentation requires to select an appropriate loss function. Several loss functions have been tested, all them for segmentation purposes, such as 'mean squared error—mse', 'Dice' loss, 'generalized Dice' loss, 'focal' loss or 'Tversky' loss. 'Tversky' loss provides better results than other loss functions (cf., Tversky, A., 1977. Features of similarity. Psychol. Rev. 84, 327-352. doi:http://dx.doi.org/10.1037/0033-295X.84.4.327). As it is explained in Sudre et al. (Sudre, C. H., Li, W., Vercauteren, T., Ourselin, S., Cardoso, M. J., Group, T. I., 2017. function for highly unbalanced segmentations, in: International Workshop on Deep Learning in Medical Image Analysis International Workshop on Multimodal Learning for Clinical Decision Support. pp. 1-8. doi:10.1007/978-3-319-67558-9_28) and Abraham and Khan (Abraham, N., Khan, N. M., 2019. A Novel Focal Tversky loss function with improved Attention U-Net for lesion segmentation, in: 2019 IEEE 16th International Symposium on Biomedical Imaging (ISBI). doi:10.1109/ISBI.2019.8759329), Tversky loss has two hyper-parameters $\alpha$, $\beta$, that can be tuned to shift the emphasis to improve recall in the case of large class imbalance. For the damage segmentation problem, best results have been obtained with $\alpha=0.3$, $\beta=0.7$.

Data augmentation techniques were applied during the training process to increase the variability of the images seen by the network. Affine transformations were applied. Modifications in color channels were also applied in the RGB or HSV color space. Because necrosis has a similar color as soil in RGB color space, routines were generated which force the network how to see the damaged regions that should be unambiguously distinguished from soil.

As stated before, only images containing damaged regions have been shown to the CNN2 model for training purposes. 625 images were used for training (400 images only containing necrosis and 225 images containing both necrosis and leaf curling); 94 images were used for validation (50 images only containing necrosis and 44 images containing both necrosis and leaf curling); and the same subset of 164 images used for corn segmentation testing are used here for testing the damaged regions.

The trained CNN2 finally provides said sub-portions 20n, 20l of the second segmented output 202s with a high level of accuracy. This output is then provided as input to a damage measurement module 130 to compute damage measures 131 by damage type. The damage measures 131 are finally provided to the user of the system (e.g., the farmer) via the interface 110 (or any other appropriate interface) as important input for the further treatment of the field.

The damage measurement module 130 determines 1500 the damage measure 131 for the at least one crop plant for each damage type 20n, 201 based on the respective sub-portions of the second segmented output 20s2 in relation to the crop portion of the first segmented output 20s1. For example, the damage measure for necrosis can be computed as the ratio between the number of pixels belonging to sub-portion 20n and the number of pixels belonging to crop portion 20c. In other words, the expected output of the process is finally the percentage of damage in the crop, which of course requires a quantification of the respective pixels. The number of pixels labelled as necrosis 20n or leaf curling 201 are summed up separately. The number of pixels of the segmented crop 20c is also quantified. The relation between each of the detected damage types and the crop can be calculated.

For the image 601 shown in FIG. 6, a comparison was made between the assessment results provided by the system 100 vs. the assessment provided by a human expert based on a visual assessment of the crop plants and in comparison to a ground truth based on annotated contours in the image. The result is shown in table 1.

TABLE 1 comparison of damage assessments

|  | Necrosis | Leaf curling |
|---|---|---|
| Estimated by CNN model | 57.63% | 17.08% |
| GT (annotated contours) | 54.15% | 20.56% |
| visual assessment | 40% | 35% |

The first row of table 1 illustrates the damage percentages as determined by the system 100 based on the multi-stage deep learning approach disclosed herein. The second row was determined based on the ground truth generated by a manual annotator using the LabelMe tool (an annotation tool provided by the MIT and tuned for the object of this work) for the identification of the contours of the damaged regions and the crop portions. The third row is determined by a visual assessment of the damage, performed by field experts, that provide a global value of the damage impact based on the experience and the criteria agreed among the different field specialists and the growing stage of predefined "control plots", that have not been treated with herbicides. A control plot typically has an approximate size of 1×1 $m^2$ like the inspected plot. Thereby, the experts estimated the percentages of damaged plant areas merely by visual assessment. It is to be noted that the field experts that performed the visual inspection had more information than the deep learning-based model. It has been estimated that on average the images of the training dataset represent about 80-90% of a plot. Even if the camera is placed at a fixed position and the field of view is adjusted, the image contains less information than the real plot. Moreover, the images were taken from a zenithal point of view. This fact removes the height information (third axis of the Cartesian coordinate system). The only inputs to the convolutional neural networks are 2D images. Undoubtedly and even in an unconscious way, the third dimension available in the real field provides extra information in the evaluation process to the annotators. This is not considered in a 2D image. In a 2D projection of a plot, it is possible that some leaves are overlapping each other, and that damage of a covered leaf cannot be detected. It may be possible that with the 3D view this overlap is avoided and added to the global damage computation. So, the damage estimated over a 2D zenithal image, that represents the 80% of the plot information, cannot provide itself the same damage value than the real plot. Nevertheless, the accuracy of the damage identification by the claimed multi-stage CNN solution is far better than what was achieved by the field experts with visual assessment.

For comparison purposes, it was necessary to express all assessment values in percentage ranges. The visual assessment is already in percentage ranges, and the manual annotation has been transformed into percentage values considering the pixels of the contoured damaged regions in relation to the areas that have been annotated as corn. There is a strong deviation between the expert assessment and the damage impact assessment provided by the claimed system. The system result is very close to the manual annotation result and is likely more accurate than the manual annotation because it is known that convolutional neural networks can distinguish image features in a more accurate way than human annotators once the CNNs are trained appropriately.

The obtained results reveal good performance. For example, metrics F1 of 0.9241 and BAC of 0.9392 are obtained for corn segmentation. Standard deviation for 164 images in a testing subset is of 0.0443 and 0.026 for F1 and BAC, respectively, which reveals low dispersion in the results. Over the corn, the damage estimation has been measured in terms of MAE (Mean Absolute Error) of 8.0 for necrosis and 6.5 for leaf curling regarding visual assessment. The solution was embedded to be used in mobile devices. It has been tested in the field, with diverse illumination conditions, growing stages and background variability.

The results have been validated by using standard metrics known for measuring the performance of CNNs. Such standard metrics used to measure the performance of deep learning neural networks are explained in a plurality of documents including for example:

Kamilaris, A., Prenafeta-Boldú, F. X., 2018. Deep learning in agriculture: A survey. Comput. Electron. Agric. 147, 70-90. doi:10.1016/j.compag.2018.02.016

Lateef, F., Ruichek, Y., 2019. Neurocomputing Survey on semantic segmentation using deep learning techniques. Neurocomputing 338, 321-348. doi:10.1016/j.neucom.2019.02.003 (At the end of this paper, there are some typical metrics described. It is to be noted that IoU=F1)

Johnson, M. T. J., Bertrand, J. A., Turcotte, M. M., 2016. Precision and accuracy in quantifying herbivory. Ecol. Entomol. 41, 112-121. doi:10.1111/een.12280.

The described algorithms were developed on Python programming language and deployed as a service on a Linux based processing server. The system is provided as a docker image. These algorithms are based on Deep learning paradigm using Tensorflow framework as backend. The deployed service was prepared with REST Application Programming Interface that managed the connections from smartphone applications. Processing time of the algorithm was about 5.0-6.0 seconds depending on the resolution of the input images, being the higher time obtained for images 4000×6000 pixels size. The input images are initially resized to 768×768, as indicated in previous sections. Response time is good for mobile applications and depends on the mobile device.

Several tests were done to validate the results of the proposed method for the different cases. Metrics were established. There are two different solutions that were measured: 1) corn segmentation; 2) damage estimation. For the corn segmentation, F1 and BAC have been established as segmentation metrics.

The expression to calculate those metrics are shown next in relation to sensibility and specificity.

BAC=(sens+esp)/2

F1=(2*PPV*sens)/(PPV+sens)

where sensibility is sens=TP/(TP+FN), the specificity is esp=TN/(TN+FP), and the Positive Predictive Value PPV=TP/(TP+FP), being TN the true negative values; FP, the false positive values; FN, the false negative values and TP the True Positive values.

For the damage estimation, in terms of comparison with visual assessment way of measurement, in percentage range, RMSE and MAE have been established, together with R2.

This R2 value is a statistical measure of how close the data are to the fitted regression line. It is also known as the coefficient of determination. A desirable value of R2 is 1.0. It means there is no error in the regression, and the predicted values fit a perfect line with slope of value 1.0 in relation to the ground truth values. An R2 of value 0 means that the predicted values are not better than taking the mean value of the x axis values. If the R2 value is negative, it means that the model is performing worse than the mean value.

Mean Absolute Error (MAE) and Root Mean Squared Error (RMSE) present similarities with the human understanding, since they represent the direct relation between the predicted value and the real value. The metrics are calculated this way:

$$MAE = \frac{\sum_{i=1}^{N}(y_i^{EST} - y_i^{GT})}{N}$$

$$RMSE = \sqrt{\frac{\sum_{i=1}^{N}(y_i^{EST} - y_i^{GT})^2}{N}}$$

Results for corn segmentation: Metrics values for CNN1 that performs corn segmentation are F1=0.9241, with standard deviation σ=0.0443; and BAC=0.9392, with standard deviation σ=0.026. The average metrics values of the 164 images in the dataset are very good, and there is small dispersion in the values, as the standard deviation reveals.

TABLE 2

Results for Herbicide impact estimation using annotated images with the contoured regions as GT (ground truth): metrics obtained for different approaches

|  | Baseline: damage detection over whole input image | | Damage detection over CNN1 output and 'mse' loss | | Damage detection over CNN1 output and 'Tversky' loss | |
| --- | --- | --- | --- | --- | --- | --- |
|  | NECROSIS | LEAF CURLING | NECROSIS | LEAF CURLING | NECROSIS | LEAF CURLING |
| MAE | 45.83 | 4.4 | 7.65 | 6.83 | 4.71 | 2.31 |
| RMSE | 54.05 | 10.05 | 11.63 | 9.80 | 7.41 | 4.95 |
| R2 | −1.66 | −0.81 | 0.49 | 0.40 | 0.87 | 0.42 |

Table 2 illustrates metrics using a baseline approach where damage is segmented over the entire input image vs. metrics for damage detected with using the segmented corn as output of CNN1 and using 'mse' loss for training CNN2 vs. metrics for damage detected with using the segmented corn as output of CNN1 and using 'tversky' loss for training CNN2. The GT is the contoured regions of the images manually annotated with the LabelMe tool Clearly, the claimed approach (middle and right column pairs of table 2) show much better results that the Baseline approach (left column pair). Thereby, the implementation using the 'Tversky' loss shows superior performance compared to the implementation using the 'mse' loss function which is due to the fact that the training data set included unbalanced classes as described earlier. The disclosed two-stage approach for herbicide impact estimation with an initial segmentation of the crop to be analyzed and the further detection of the damaged regions within the identified crop portions reduces the number of false positives, understood as the identification of necrosis and leaf curling areas in other plants different from the crop (e.g., corn). The two damage types necrosis and leaf curling are reliably identified in early or late stages, and in a wide range in between.

The two-stage CNN algorithm has been validated for corn crop in the wild. The images gather a wide range of different conditions, such as diverse illumination associated to different acquisition moments along the day, climatological conditions, acquisition devices and growing stages in the crop. Overlaps among plants due to growing stages are also included. The algorithm has been deployed on a real smartphone application and validated under real field conditions in a pilot study located in Spain. The disclosed algorithm allows real time performance with the following pipeline: crop segmentation and semantic segmentation for damage detection and quantification over isolated crop regions. The disclosed algorithm and methodology can also be used for detection of other damage types (e.g., bleaching) and quantification processes.

Another damage that is associated with the application of a herbicide is height reduction of the crop plants which were subject to the herbicide application. However, with images showing a 2D zenithal view of the agricultural field (as the images used for training the convolutional neural networks of system 100 in FIG. 1) it is not possible to estimate height reduction which would require the information of the height of the crop plants in a third dimension. As an alternative measure to estimate this damage biomass reduction is used instead. Although there is no linear correlation between this biomass reduction of the crop plants and the height reduction of such plants, it has been proven that the biomass reduction measure also provides meaningful information with regards to how the herbicide application may inhibit the growth of the crop plants which not only affects the height of the plant but also the size of other plant elements such as the leaves. Crop plants with lower heights typically also have smaller leaves than plants bigger plants which is reflected by reduction of the overall biomass of the plants. Typically, the height or biomass comparison is estimated in relation to a control (reference) plot where field specialists inspect both, a test plot and one or more reference plots and establish a visual assessment that tries to represent as much as possible the height and/or biomass reduction. Field specialists typically use different types of reference plots: 1) untreated control plot, and 2) control plot with a standard herbicide product. A standard herbicide product is a product which is applied in an herbicide treatment that is fully under control, and it is known in advance how the application of this standard product will affect the respective control plot.

FIG. 7 illustrates an approach which associates the biomass of the crop plants in an image with the number of pixels belonging to the crop portions in that image. FIG. 7 includes a block diagram of a computer system 100' for determining biomass reduction of crop plants 11 in an agricultural field after herbicide application. FIG. 8 is a simplified flow chart of a computer-implemented method 2000 for determining biomass reduction of crop plants after herbicide application. The method 2000 can be executed by the system 100'. For this reason, FIG. 7 is described in view of FIG. 8 and the following description of FIG. 7 also refers to reference numbers used in FIG. 8.

In general the computer system 100' includes an interface 110 configured to receive 2100 a test image 20 representing a real world situation of a test plot 10-1 in the agricultural field after herbicide application, with at least one crop plant. An image pre-processing module 120 rescales 2200 the received image 20 to a rescaled image 20a matching the size of an input layer of a convolutional neural network (CNN1) referred to as CNN. The CNN has been trained to segment the rescaled image 20a into crop portions 20c (pixels associated with crop plants 11) and non-crop portions (pixels associated with soil 12 or other green plants 13), and provides a segmented output 20s indicating the crop portions 20c of the rescaled image 20a with pixels belonging to representations of crop.

The system further includes means to access a reference plot image storage 20cps comprising one or more segmented reference images 20cps1, 20cps2, 20cps3 indicating crop portions 20cpc associated with one or more untreated reference plots 10-2 in the agricultural field (i.e. plots without herbicide application). The segmented reference images are obtained by applying the image pre-processing module 120 and the CNN (CNN1) to reference images 20cp representing real world situations of the corresponding one or more reference plots 10-2. Thereby, each reference plot is of approximately the same size as the test plot and the one or more reference images 20cp were recorded under comparable conditions as the test image 20. In other words, the rescaling and segmentation tasks are performed in the same way for the reference plot related images as they are performed for the test image.

Finally, a biomass measurement module 140 determines a biomass reduction measure 141 for the at least one crop plant by determining a ratio BR(%) between the number of pixels in crop portions 20c associated with the test plot and the number of pixels of crop portions 20cpc associated with the one or more reference plots. In the case of at least two reference plots the ratio is determined by averaging over the reference plots. Averaging can be performed by firstly computing said ratio for each control plot and then computing the average of all ratios. Alternatively, averaging can be performed by firstly computing the average number of pixels associated with crop portions over all reference plots and then computing the ratio between the number of pixels in crop portions 20c associated with the test plot and the average number of pixels of crop portions 20cpc associated with the reference plots.

In more detail, the system 100' includes an interface 110, an image pre-processing module 120, and a convolutional neural segmentation network CNN1. For such modules the same references numbers are used as for the corresponding modules of system 100 in FIG. 1 because these modules of system 100' are functionally equivalent to those of system 100 of FIG. 1.

In addition to receiving 2100 from the image recording device 210, the image 20 representing a real world situation in a test plot 10-1 of the agricultural field after herbicide application, the system 100' also receives one or more images 20cp representing the real world situation in one or more reference plots 10-2 of the agricultural field. Reference plots are also referred to as control plots herein. The reference/control plots 10-2 are of substantially the same size as the test plot. However, the control plots were not subject to herbicide application in the past. Therefore, it is assumed that no damage caused by herbicide application is present in the control plots. In other words, the crop plants growing in control plots 10-2 are primarily healthy 11-0 plants. Still some weeds 13 may appear in the control plots 10-2, and even if the crop is not affected by the herbicide, the height and biomass of the crop plants 11 may be affected by the presence of the weeds 13 that cohabit in the same place. For this reason, it may be advantageous to take images from a plurality of control plots showing the situation at different locations in the field where no herbicides were applied.

Taking images from different locations allows for computing average values later on. Such images may all be taken by the same camera 210 which is used for recording the image of the test plot while the camera should be mounted always in substantially the same setup as in the test plot. Alternatively, the images may be taken by functionally equivalent camera devices 210' which are statically mounted above each reference plot wherein the static mounting is comparable to that of the camera 210 for the test plot.

The real world situation in the test plot 10-1 is schematically illustrated by a plurality of (green) crop plants 11 which are growing on soil 12 and corresponds to the real world field situation of the agricultural field 10 illustrated in FIG. 1. Together with the crop plants also other green plants 13, such as weeds, may be found in the test plot. The green parts of crop plants 11 (e.g., leaves, stems, etc.) show different damage types. For example, crop leaves with damage type 11-1 are supposed to be infested by leaf curling, crop leaves with damage type 11-2 are supposed to be infested by necrosis. Biomass reduction is a further damage type which is not visualized explicitly in the schematic figure as it typically affects the size of all plant elements of a crop plant. Healthy parts of the crop plants are indexed with the type reference 11-0.

The image recording device typically is a digital camera device which can provide images at resolutions between 3000×4000 to 4000×6000 pixels. With such a high resolution camera the field of view (illustrated by the dashed lines) of the camera 210 can be selected to cover a relatively large area (in the order of 1×1 m$^2$) of the agricultural field 10 and still provide sufficient image details to perform the herein disclosed image analysis by positioning the camera at an appropriate distance to the crop plant(s) (e.g., approximately one meter above the crop plants). However, for determining the biomass in the test/control plots, cameras with lower resolution may be usable as well because the detection of early stage necrosis (requiring the high resolution images) is not relevant. The image may be taken from a zenithal position with an appropriate distance above the crop plants providing images showing a 2D zenithal view of the respective plot.

The recorded image is sent to the computer system 100' where it is further processed. In a first step, the received image 20 is rescaled 2200 by the image preprocessing module 120 of the system 100' (same function as the image preprocessing module 120 of system 100 in FIG. 1) so that the rescaled image 20a matches the size of the input layer of the convolutional neural network CNN1 of the system (with the same function as CNN1 of system 100 in FIG. 1). As disclosed in the context of FIG. 1, CNN1 has been trained to segment the rescaled image 20a into crop portions 20c (pixels associated with crop plants 11) and non-crop portions (pixels associated with soil 12 or other green plants 13). When CNN1 is applied 2300 to the rescaled image it provides a segmented output 20s indicating the crop portions 20c of the rescaled image 20a with pixels belonging to representations of crop (function equivalent to CNN1 of system 100).

The system 100' further includes means to access a reference plot image storage 20cps comprising one or more segmented reference images 20cps1, 20cps2, 20cps3 indicating crop portions 20cpc associated with one or more reference plots 10-2 in the agricultural field. The reference plots were not subject to herbicide application and are therefore expected to show no damages caused by herbicides. In one embodiment, the reference plot image storage 20cps may be implemented as an image database being an integral component of the system 100'. In this case, the system can access the stored images via an internal bus of the system. In other embodiments, the reference plot storage may be stored on a remote system which is communicatively coupled with the system 100' so that the images can be retrieved by the system 100' from the remote image storage.

The segmented reference images 20cps1, 20cps2, 20cps3 are obtained in the same way as the segmented test image 20s by correspondingly applying the image pre-processing module 120 and the CNN (CNN1) to reference images 20cp representing real world situations of the corresponding one or more reference plots 10-2. As stated above, each reference plot is of approximately the same size as the test plot and the one or more reference images 20cp were recorded under comparable conditions as the test image 20.

Finally, a biomass measurement module 140 determines 2500 a biomass reduction measure 141 for the at least one crop plant by determining a ratio BR(%) between the number of pixels in crop portions 20c associated with the test plot and the number of pixels of crop portions 20cpc associated with the one or more reference plots. In other words, the biomass measurement module 140 compares 2400 the size of crop portions 20c in the segmented input image 20s with the size of crop portions 20cpc of previously segmented reference plot images 20cps1, 20cps2, 20cps3. The biomass reduction measure 141 is finally provided to the user via the interface 110. In the case of at least two reference plots the ratio is determined by averaging over the reference plots. Averaging can be performed by firstly computing said ratio for each control plot and then computing the average of all computed ratios. Alternatively, averaging can be performed by firstly computing the average number of pixels associated with crop portions over all reference plots and then computing the ratio between the number of pixels in crop portions 20c associated with the test plot and the average number of pixels of crop portions 20cpc associated with the reference plots.

FIG. 9 illustrates in more detail the function of the biomass measurement module 140. Image 20s is the segmented input image as provided by CNN1. Images CP1 to CP6 are segmented reference images from corresponding control plots and are retrieved from reference image storage 20cps. The biomass measurement module 140 has a sub-module 143 for comparing the test image 20s with the reference images CP1 to CP6. Thereby, an averaging sub-module 144 is used to compute an averaged value for the ratio over multiple control plots resulting in the biomass reduction measure value 141.

FIG. 10 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Ideally, device 900 has a GPU adapted to process machine learning algorithms. Generic computer device 900 may correspond to the computer system 100 of FIG. 1 or computer system 100' of FIG. 7. Computing device 950 is intended to represent various forms of mobile devices, such as personal digital assistants, cellular telephones, smart phones, and other similar computing devices. For example, computing device 950 may be used as a GUI frontend for a user to capture test input images and provide them to the computer device 900, and in turn, receive from the computer device, the damage measures by damage type. Thereby computing device 950 may also include the output device 50 of FIG. 1. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processing units and/or multiple buses may be used, as appropriate, along with multiple memories and types of memory. Also, multiple computing devices 900 may be connected, with each device providing portions of the necessary operations (e.g., as a server bank, a group of blade servers, or a processing device).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processing units. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

FIGS. 11 to 13 illustrate the effect of data augmentation using color transformation processes for a subset of training images used for the training of the first CNN.

FIG. 11 shows the segmentation result achieved by the first CNN when using a training dataset which does not include images augmented using color transformation processes. The image RGB1 corresponds to an original RGB image taken in a corn field. The image NCT-S1 corresponds to the mask (segmented output) provided by the first CNN when applying the trained first CNN to RGB1 when the first CNN was trained without adding transformations into other color spaces in the data augmentation stages. In the example, only affine transformations were added in data augmentation process for training the first CNN, such as flip, rotation, shift, scaling, etc.

The three white rectangles in RGB1 show image portions where necrotic elements of the corn plants are included. In the segmentation result reflected by the mask image NCT-S1, the corresponding three white rectangles are primarily filled with black pixels (i.e., the pixels are filtered out as non-corn-plant associated pixels) because necrosis was confused by the trained first CNN with soil since necrotic plant elements have a brownish color similar to the color of soil. This is in particular a problem for the segmentation of damaged leaves of the corn plants. Prior art solutions address the segmentation problem over healthy plants and/or over controlled backgrounds that allow high contrast to segment the plants—for instance where a leaf is placed over white background. However, in a real-world situation in the wild with changeable illumination conditions, such approaches fail to distinguish in particular soil from necrotic plant elements.

FIG. 12 illustrates the segmentation result CT-S2 provided by the first CNN trained with color transformation in the data augmentation stage. The trained CNN was applied to the real-world RGB image RGB2 showing corn plants in an agricultural field. The white rectangle with a solid line highlights a portion of the RGB image showing necrotic corn leaves. The segmentation output (mask) CT-S2 includes the pixels of the necrotic plant element as corn-related pixels. In the original test input RGB2 one might get the impression that the necrotic pixels can be distinguished over the soil pixels because of their shadows on the soil. However, FIG. 11 has clearly shown that the first CNN is not able to learn this distinction from the training images without using color transformation processes. The image portion inside the dashed white rectangle in RGB2 includes shadow pixels on the soil in relation to the large corn leaf on the left of the dashed rectangle. The corresponding dashed rectangle in the mask image CT-S2 shows that all such pixels were correctly identified as soil pixels which were filtered out (i.e., set to black). That is, the shadow of necrotic plant elements does not help the first CNN to recognize necrotic pixels as being associated with plant elements. Further, shadows would only be present on sunny days and would therefore not be suitable at all as a distinguishing feature.

FIG. 13 illustrates a color transformation process CT1 for an example where an RGB image is transformed into the HSV color space. In general, a color image is constituted of three grayscale channels, whatever color space is chosen for its representation. The color image is built with such monochrome channels. In a grayscale image, for example codified in uint8, the pixel values can range between 0 (black) and 255 (white), with different grayscale values in between.

The upper row of CT1 shows the R, G, and B channels of the original training image before augmentation with color transformation. The white-circled regions contain pixels associated with necrotic corn leaves and soil pixels. In the RGB space, it can be appreciated that there is only a very small difference between soil pixels and necrosis pixels in all three channels. The lower row of CT1 shows the H, S, and V channels after the RGB image has been transformed into the HSV color space. In particular, in the Saturation (S) plane, it can be observed that necrosis pixels appear with a substantially higher contrast in relation to soil pixels than in the RGB channels.

This effect can be used for creating training images for the first CNN in the data augmentation stage making the CNN learn the segmentation with such forced transformations. This approach has been proven to be very successful because necrosis pixels can be clearly distinguished from soil pixels which finally leads to a proper segmentation output with a mask image also including pixels of necrotic plant elements.

Applying color transformation in the data augmentation stage means to firstly transform the RGB image into another color space. The HSV color space has been shown to be useful because in particular in the S plane necrotic pixels can be clearly distinguished from soil pixels. However, the transformation can also be performed into any other color space which includes at least one channel where necrotic pixels are clearly distinguishable from soil pixels.

In the transformed color space, the pixels are now modified randomly for at least one of the three channels. For example, in the HSV color space, HSV values may be varied in a random range [−30, 30] for any or all of the three channels. In other words, there is a random selection of the value of the range, and also of the channel to which the randomly chosen values are applied. It is to be noted that such a color transformation does not destroy the image information needed for segmentation of (damaged) plant elements as it only affects the colors but not the edges in the image. However, the edges of image regions contain relevant information for segmentation (and not only the surface of the plant elements). Such random modifications (instead of applying always the same modification) allow to achieve a higher variability for the training images. For example, for one training image the channels may be modified with (H+10, S+0, V−5), and in another training image the applied modification may be (H−10, S+7, V−18). By performing color-transformation-based data augmentation on a subset of the training images, the first CNN also learns from this subset of training images to segment edge information independently from the surface information, but also learns the surface information related features (e.g., color, texture, etc.) from the remaining training images which did not undergo color transformation augmentation.

Finally, the transformed modified image is then transformed back into the RGB color space to create a color transformation augmented training image. This augmented training image has of course other colors than the original RGB training image. However, the edges in the image remain the same. It is possible to transform a single RGB training image into the other color space (e.g., HSV) and apply a plurality of random modifications to the transformed image so that a plurality of transformed modified images is generated from a single RGB training image. Each of these transformed modified images can then be transformed back into the RGB color space resulting in a plurality of training images with an increased variability for the first CNN. This leads to a more robust training of the first CNN to improve its capability for learning to distinguish between necrotic pixels and soil pixels.

FIGS. 14A and 14B illustrate data augmentation for two training images using color transformation. The images on each figure show the different stages during the color transformation process. The process always starts with the original RGB image RGB*. In the example, this image is then transformed into the HSV color space into the transformed image HSV*. Other color spaces can be used as well. The transformed image HSV* is then randomly modified for each channel (H±*, S±*, V±*) into the modified image HSV*m. The modified image HSV*m is finally transformed back into the RGB color space resulting in the augmented training image RGB*bt.

In FIG. 14A, RGB3 shows a zenithal view of a corn field with many corn plants showing severe necrosis symptoms. The original image shows healthy plant elements in a saturated greenish color whereas necrotic plant elements are shown in dark brownish color which is similar to the color of the soil background. After transformation, modification of the transformed image with the parameters (H+10, S−3, V+20), and back-transformation, the image RG3bt the soil pixels appear in beige color whereas the necrotic plant elements include many pixels in a very dark (almost black color). The first CNN can therefore learn to distinguish the necrotic plant elements from the soil because clearly identifiable edges were added to the image through the data augmentation process.

In FIG. 14B, RGB4 has a similar color distribution as RGB3 and also shows significant necrosis symptoms in a plurality of corn leaves. The modification parameters which are applied to the transformed image HSV4 are (H+50, S+50, V+50) resulting in the modified image HSV4m. The back-transformed RGB image RGB4bt has very unnatural colors. While the color of the healthy corn leaves is a darker greenish color, the soil pixels are shown in a bright greenish color. Again, the necrotic plant elements include many pixels in a very dark (almost black color).

To conclude, using color transformation processes in the data augmentation stage allows to enhance the training dataset with back-transformed RGB images which show necrotic pixels in a color that is very different from the color of the soil pixels. It is to be noted that the edges in the images remain unchanged during all the transformations and random modifications. However, the resulting back-transformed RGB images allow the first CNN to learn how to better distinguish between necrotic plant elements and soil in an image. Therefore, the segmented output (mask image) includes also damaged plant elements which are lost with the classic segmentation approaches.

The invention claimed is:

1. A computer-implemented method for determining damage on crop plants after herbicide application in an agricultural field, comprising:
receiving an image representing a real world situation in the agricultural field after herbicide application, with at least one crop plant;
rescaling the received image to a rescaled image matching the size of an input layer of a first convolutional neural network (CNN1) referred to as the first CNN,
the first CNN (CNN1) being trained to segment the rescaled image into crop and non-crop portions by using color transformation processes in a data augmentation stage allowing the first CNN to learn to distinguish between soil related pixels and necrotic crop related pixels, and to provide a first segmented output as a mask identifying the crop portions in the rescaled image including necrotic parts of the crop plant;
applying the first CNN (CNN1) to the rescaled image to provide, to a second convolutional neural network (CNN2) referred to as the second CNN, the first segmented output,
the second CNN (CNN2) being a semantic segmentation neural network trained to segment said crop portions into one or more sub-portions with each sub-portion including pixels associated with damaged parts of the crop plant showing a respective damage type being a particular damage type of a plurality of damage types comprising necrosis and at least one further damage type;
applying the second CNN (CNN2) to the crop portions of the rescaled image to identify, in a second segmented output, damaged parts of the at least one crop plant by damage type for the plurality of damage types; and
determining a damage measure for the at least one crop plant for each damage type based on the respective sub-portions of the second segmented output in relation to the crop portion of the first segmented output.

2. The method of claim 1, wherein the types of damage further comprise any of leaf curling and bleaching.

3. The method of claim 1, wherein the first CNN and/or the second CNN is based on a segmentation topology selected from the group of: Fully Convolutional Dense Net, UNet, and PSPNet.

4. The method of claim 1, wherein the first CNN is trained using a first loss function (LF1) to measure the performance of the first CNN to segment the resealed image into crop and non-crop portions with at least a first non-crop portion associated with soil and a second non-crop portion associated with non-crop green plants.

5. The method of claim 1, wherein the second CNN is trained using a second loss function (LF2) selected from the group of: mean squared error loss, dice loss, generalized dice loss, focal loss, or Tversky loss.

6. The method of claim 1, wherein the resealed image is reduced in size compared to the received image while the damage symptoms associated with any type of damage are still visible on the resealed image.

7. The method of claim 6, wherein a training data set for training the first CNN includes: images with healthy crop plants, images with damaged crop plants with damages of different damage types, and images with damaged or healthy crop plants and non-crop plants.

8. The method of claim 7, wherein a further training data set for training the second CNN includes images with damaged crop plants with damages of different damage types.

9. The method of claim 7, wherein a particular subset of images the training data set is augmented by
transforming the images of the subset from the RGB color space to another color space;
modifying intensity values of respective transformed color channels randomly; and
transforming the modified images back into the RGB color space.

10. A non-transitory computer-readable medium having instructions thereon encoding a computer program product for determining the impact of herbicides on crop plants in an agricultural field, wherein the instructions, when executed by memory of a computing device and executed by at least one processor of a computing device, cause the at least one processor to execute the steps of the computer-implemented method according to claim 1.

11. A computer system for determining damage on crop plants after herbicide application in an agricultural field, comprising:
an interface configured to receive an image representing a real world situation in the agricultural field after herbicide application, with at least one crop plant;
an image pre-processing module configured to rescale the received image to a resealed image matching the size of an input layer of a first convolutional neural network (CNN1) referred to as the first CNN;
the first CNN, being trained to segment the resealed image into crop and non-crop portions by using color transformation processes in a data augmentation stage allowing the first CNN to learn to distinguish between soil related pixels and necrotic crop related pixels, and to provide a first segmented output as a mask identifying the crop portions in the resealed image including necrotic parts of the crop plant;
a second convolutional neural network (CNN2), referred to as the second CNN, being a semantic segmentation neural network trained to segment said crop portions into a second segmented output with one or more sub-portions with each sub-portion including pixels associated with damaged parts of the crop plant showing a respective damage type being a particular damage type of a plurality of damage types comprising necrosis and at least one further damage type;
a damage measurement module configured to determine a damage measure for the at least one crop plant for each damage type based on the respective sub-portions of the second segmented output in relation to the crop portion of the first segmented output.

12. The system of claim 11, wherein the damage types further comprise any of leaf curling and bleaching.

13. The system of any of claim 11, wherein the first CNN and/or the second CNN is based on a segmentation topology selected from the group of: Fully Convolutional Dense Net, UNet, and PSPNet.

14. The system of any of claim 11, wherein the first CNN is trained using a first loss function (LF1) to measure the performance of the first CNN to segment the rescaled image into crop and non-crop portions, the second CNN is trained using a second loss function (LF2) selected from the group of: mean squared error loss, dice loss, generalized dice loss, focal loss, or Tversky loss.

15. A computer system for determining biomass reduction of crop plants after herbicide application in an agricultural field, comprising:
an interface configured to receive a test image representing a real world situation of a test plot in the agricultural field after herbicide application, with at least one crop plant;
an image pre-processing module configured to rescale the received image to a rescaled image matching the size of an input layer of a convolutional neural network (CNN1) referred to as CNN;
the CNN, being trained to segment the resealed image into crop and non-crop portions, and configured to provide a segmented output indicating the crop portions of the resealed image with pixels belonging to representations of crop;
means to access a reference plot storage comprising one or more segmented reference images indicating crop portions associated with one or more reference plots in the agricultural field without herbicide application, the segmented reference images obtained by applying the image pre-processing module and the CNN (CNN1) to reference images representing real world situations of the corresponding one or more reference plots, with each reference plot being of approximately the same size as the test plot and the one or more reference images being recorded under comparable conditions as the test image;
a biomass reduction measurement module configured to determine a biomass reduction measure for the at least one crop plant by determining a ratio between the number of pixels in crop portions associated with the test plot and the number of pixels of crop portions associated with the one or more reference plots wherein, in the case of at least two reference plots, the ratio is determined by averaging over the reference plots.

* * * * *